US011643987B2

United States Patent
Montgomery et al.

(10) Patent No.: US 11,643,987 B2
(45) Date of Patent: May 9, 2023

(54) IN-LINE GENERATION OF PILOT FUEL FOR POWER SYSTEMS

(71) Applicant: Caterpillar Inc., Peoria, IL (US)

(72) Inventors: David T. Montgomery, Edelstein, IL (US); David M. Ginter, Peoria, IL (US); Michael Bardell, Peoria, IL (US); Arnold Kim, Peoria, IL (US); Kenth Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/468,387

(22) Filed: Sep. 7, 2021

(65) Prior Publication Data

US 2023/0070006 A1    Mar. 9, 2023

(51) Int. Cl.
| | |
|---|---|
| *F02D 41/00* | (2006.01) |
| *F02D 35/02* | (2006.01) |
| *F02M 21/02* | (2006.01) |
| *F02D 41/14* | (2006.01) |
| *F02D 41/40* | (2006.01) |

(52) U.S. Cl.
CPC ....... *F02D 41/0027* (2013.01); *F02D 35/023* (2013.01); *F02D 41/1446* (2013.01); *F02D 41/1448* (2013.01); *F02D 41/403* (2013.01); *F02M 21/0227* (2013.01)

(58) Field of Classification Search
CPC .............. F02D 41/0027; F02D 35/023; F02D 41/1446; F02D 41/1448; F02D 41/403; F02M 21/0227
See application file for complete search history.

(56) References Cited

U.S. PATENT DOCUMENTS

| | | | | |
|---|---|---|---|---|
| 4,416,229 | A | * | 11/1983 | Wood ..................... F02M 43/00 123/304 |
| 4,422,412 | A | | 12/1983 | Norton |
| 4,444,166 | A | * | 4/1984 | Kovacs ............... F02B 23/0672 123/262 |
| 4,876,989 | A | | 10/1989 | Karpuk et al. |
| 5,095,872 | A | * | 3/1992 | Kawamura ........... F02B 19/165 123/270 |
| 5,097,803 | A | | 3/1992 | Galvin |
| 5,136,994 | A | * | 8/1992 | Gale ....................... F02B 51/02 123/143 B |

(Continued)

*Primary Examiner* — Joseph J Dallo
(74) *Attorney, Agent, or Firm* — Lee & Hayes, P.C.

(57) ABSTRACT

A system includes a fuel tank and a dehydration reactor that are configured to provide a primary fuel and a pilot fuel to a power system. The fuel tank is configured to store the primary fuel and is fluidly connected to a reactor feed line and a primary fuel line provide the primary fuel. The dehydration reactor is configured to receive the primary fuel via the reactor feed line and convert a portion of the primary fuel to the pilot fuel and a byproduct. The power system is configured to receive the pilot fuel from the dehydration reactor to initiate combustion of the primary fuel. The power system also includes a cylinder with an internal piston that receives the pilot fuel and the primary fuel, contains the combustion reaction, and generates power from the combustion reaction; and contains the combustion reaction. A pilot fuel injector provides the pilot fuel to the cylinder at a first time to initiate combustion and a primary fuel injector provides the pilot fuel to the cylinder at to generate power via the power system.

20 Claims, 9 Drawing Sheets

(56) References Cited

U.S. PATENT DOCUMENTS

| | | | | |
|---|---|---|---|---|
| 5,417,189 | A * | 5/1995 | Regueiro | F02B 23/0687 |
| | | | | 123/262 |
| 5,692,468 | A * | 12/1997 | Haman | F02B 23/101 |
| | | | | 123/259 |
| 6,158,413 | A * | 12/2000 | Kimura | F02M 26/28 |
| | | | | 123/306 |
| 6,340,003 | B1 * | 1/2002 | Schoubye | F02B 43/10 |
| | | | | 123/3 |
| 6,435,159 | B1 * | 8/2002 | Craft | F02B 23/101 |
| | | | | 123/298 |
| 7,213,564 | B2 * | 5/2007 | Hill | F02B 43/00 |
| | | | | 123/301 |
| 7,370,626 | B2 * | 5/2008 | Schubert | F02B 19/12 |
| | | | | 123/275 |
| 7,387,104 | B2 * | 6/2008 | Sulkowski | F02M 26/01 |
| | | | | 123/301 |
| 8,065,990 | B2 | 11/2011 | Brusstar et al. | |
| 9,109,498 | B2 | 8/2015 | Bradley et al. | |
| 10,316,733 | B2 * | 6/2019 | Takemoto | F02B 19/16 |
| 2020/0256283 | A1 * | 8/2020 | Marko | F02M 21/04 |

* cited by examiner

US 11,643,987 B2

IN-LINE GENERATION OF PILOT FUEL FOR POWER SYSTEMS

TECHNICAL FIELD

The present disclosure relates to monitoring systems configured to maintain emission quality and efficient operation for internal combustion engines. More specifically, the present disclosure relates to an in-line reactor that is configured to generate a pilot fuel for various internal combustion engines.

BACKGROUND

Internal combustion engines, including diesel engines, gasoline engines, natural gas engines, gaseous fuel-powered engines, and other engines known in the art exhaust a complex mixture of air pollutants. These air pollutants are composed of gaseous compounds such as nitrogen oxides (NOx), and solid particulate matter also known as soot. Additionally, the air pollutants are produced in many engines by combustion of fuels such as diesel and gasoline. Due to increased awareness of the environment, exhaust emission standards have become more stringent, and the amount of NOx and soot emitted to the atmosphere by an engine is regulated based on the type of engine, size of engine, and/or class of engine.

Additionally, internal combustion engines that utilize a compression ignition (CI) power cycle commonly include a primary fuel tank and a pilot fuel tank such that the pilot fuel is obtained from the pilot fuel tank and the primary fuel is obtained from the primary fuel tank. The provision of the pilot fuel and the primary fuel is largely unrelated beyond the ignition of the primary fuel by the pilot fuel. However, the use of two fuels for a single power system increases the space required for fluid storage. For instance, the bulk storage of two fluids requires two independent storage tanks that are configured to store each of the two fluids under appropriate conditions for efficient storage (e.g., sufficient temperature and/or pressure to liquify a fluid, impermeable boundary layer within a tank to contain the fluid, etc.).

An example system for providing dimethyl ether as a pilot fuel is described in U.S. Pat. No. 5,097,803 (hereinafter referred to as "the '803 reference"). In particular, the '803 reference describes a methanol engine that utilizes a reactor to convert the methanol into dimethyl ether for utilization as a pilot fuel. In this system, methanol is converted into dimethyl ether via a dehydration reactor. As explained in the '803 reference, the dimethyl ether is mixed with inlet air for the methanol engine and is provided as a gaseous mixture to the methanol engine. However, the system described in the '803 reference has several deficiencies. For example, methanol has a stronger propensity for in-gas detonation, an engine-damaging combustion phenomenon, than other common fuels. Utilization of the gaseous dimethyl ether may increase the propensity of the methanol to experience in-gas detonation, reducing the overall efficiency of the methanol engine. As a result, the methanol engine may be less efficient in converting the fuel to power and may have a shorter lifecycle due to damage from in-gas detonation.

Examples of the present disclosure are directed toward overcoming one or more of the deficiencies noted above.

SUMMARY OF THE INVENTION

Examples of the present disclosure are directed to a reduction device that includes a fuel tank, a fluid pump, a dehydration reactor, and a power system. The fuel tank may be configured to store a primary fuel. Additionally, the fluid pump may be fluidly connected to the fuel tank and configured to obtain the primary fuel from the fuel tank and provide the primary fuel via a reactor feed line and a primary fuel line fluidly connected to the fluid pump. Further, the dehydration reactor may be configured to receive the primary fuel, via the reactor feed line, and convert a portion of the primary fuel to a pilot fuel and a byproduct. Further, the power system may be configured to initiate a combustion reaction with the pilot fuel, wherein the combustion reaction consumes the primary fuel, the power system comprising: a cylinder configured to receive the pilot fuel and the primary fuel, a pilot fuel injector configured to receive the pilot fuel from the dehydration reactor, and to provide the pilot fuel to the cylinder at a first time at which the combustion reaction is initiated within the cylinder, and a primary fuel injector configured to receive the primary fuel from the primary fuel line, and to provide the primary fuel to the cylinder at a second time during the combustion reaction and after the first time.

Further examples of the present disclosure are directed to a method that includes directing a first amount of a primary fuel from a fuel tank to a cylinder of a power system. Additionally, the method includes determining, based on the first amount, a second amount of a pilot fuel required to initiate combustion of the primary fuel and to enable combustion of the first amount of the primary fuel within the cylinder. Further, the method may include directing, via a reactor feed line, a third amount of the primary fuel from the fuel tank to a dehydration reactor, the dehydration reactor converting the third amount of the primary fuel to the second amount of the pilot fuel. The second amount of the pilot fuel may be directed from the dehydration reactor to the cylinder of the power system, such that the second amount of the pilot fuel is compressed within the cylinder and initiates a combustion reaction within the cylinder and the combustion reaction initiated by the second amount of the pilot fuel within the cylinder consumes the first amount of the primary fuel to drive substantially cyclical operation of the power system.

Still further examples of the present disclosure are directed to a system that is configured to perform operations that include receiving a first signal from a pressure sensor associated with a cylinder of a power system, the first signal indicating a first pressure within the cylinder. Additionally, the system may be configured to receive a second signal from a temperature sensor associated with the cylinder, the second signal indicating a first exhaust temperature associated with the cylinder. The system may determine whether the first pressure satisfies a pressure threshold associated with combustion of primary fuel within the cylinder and whether the first exhaust temperature satisfies a temperature threshold associated with combustion of the primary fuel within the cylinder. Further, the system may determine, based on at least one of the first cylinder pressure, satisfying the pressure threshold, or the first exhaust temperature, satisfying the temperature threshold, an injection timing configured to provide a pilot fuel to the power system at a first time to initiate combustion of the primary fuel injected at a second time. Additionally, the system may determine a ratio between the pilot fuel and the primary fuel, wherein an amount of the primary fuel is provided to a dehydration reactor to generate the primary fuel based on the ratio. Accordingly, the system may cause, based on the injection timing and the ratio, the pilot fuel to be provided from the dehydration reactor to the cylinder and the primary fuel to be provided from a fuel tank to the cylinder.

DETAILED DESCRIPTION

Systems and techniques described below are directed to a system that is configured to generate a pilot fuel within a power system, from a primary fuel that is consumed by the power system to generate power. As will be described below, example storage components, processing components, and monitoring components of the present disclosure are configured to maintain substantially steady state operation of the power system, and manage power generation when power demands and/or operating characteristics of the power system fluctuate.

Figure 1:
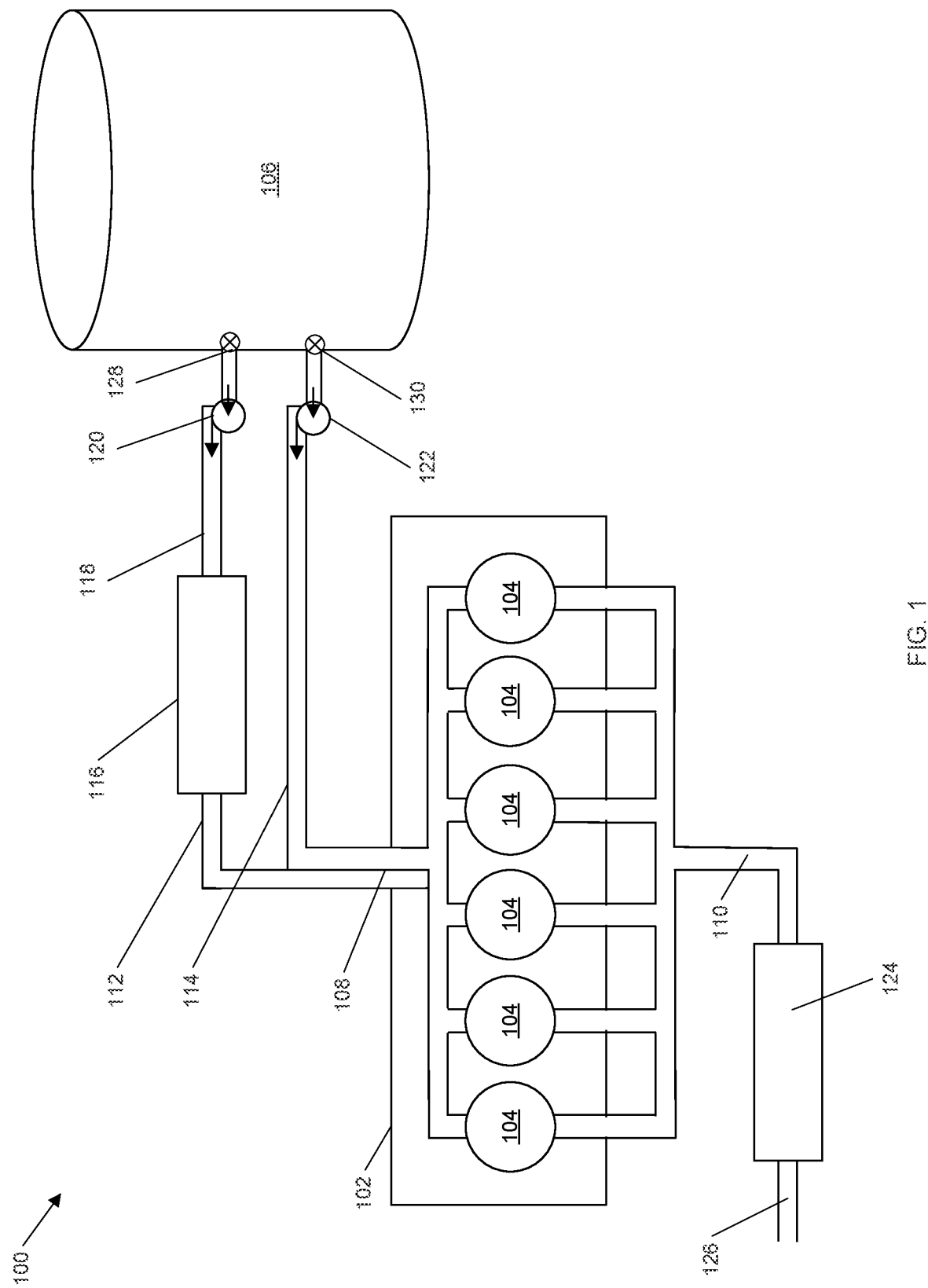
FIG. 1 illustrates an exemplary power system, such as a power system including a methanol-fueled internal combustion engine and a fuel storage tank according to examples of the present disclosure.

FIG. 1 illustrates an exemplary power system 100. For the purposes of this disclosure, the power system 100 is depicted and described as a methanol-fueled, internal combustion engine. However, it is contemplated that the power system 100 may embody other types of combustion engines that utilize other fuels to generate power and/or energy, such as, for example, a gasoline, a hydrogen, a natural gas, a liquid fuel, or gaseous fuel powered engine. The power system 100 may include an engine block 102 having a plurality of cylinders 104, and a plurality of piston assemblies (not shown) disposed within the plurality of cylinders 104 to form combustion chambers. It is contemplated that the power system 100 may include any number of combustion chambers and that the combustion chambers may be disposed in an "in-line" configuration, a "V" configuration, or in any other conventional configuration. In at least one example, the methanol-fueled internal combustion engine can be a part of a set of generators (e.g., a "gen-set") that provide power for a facility. Accordingly, while the power system 100 is depicted as including a single engine block, the power system 100 can be configured to include a plurality of engine blocks. It should be noted that the power system can be any power generating component that utilizes an internal combustion engine such as the gen-set, a maritime engine, a motor, an industrial system that utilizes internal combustion, and other related applications.

Multiple separate sub-systems may be included within the power system 100. For example, the power system 100 may include fuel tank 106 that is configured to store and provide a primary fuel to the plurality of cylinders 104 to generate power. The primary fuel and a pilot fuel may be provided to the engine block 102 and the plurality of cylinders 104 via a fuel line 108 and exhaust generated by combustion of at least the primary fuel may be output by the plurality of cylinders 104 via an exhaust line 110. The fuel line 108 may include multiple fuel-specific lines that provide the pilot fuel and the primary fuel to the plurality of cylinders 104. For example, the pilot fuel may be provided via a pilot fuel line 112 of the fuel line 108 and the primary fuel may be provided via a primary fuel line 114 of the fuel line 108. The pilot fuel may be generated by a continuous reactor 116 that receives the primary fuel via a feed line 118 and converts the primary fuel into the pilot fuel. Additionally, a pilot fuel pump 120 and a primary fuel pump 122 may be configured to extract the primary fuel from the fuel tank 106 and provide the primary fuel via the feed line 118 and the primary fuel line 114, respectively. Further, the exhaust line 110 may receive the exhaust from the plurality of cylinders 104 and direct the exhaust to a selective catalytic reduction (SCR) system before exhausting the exhaust to the atmosphere. The power system 100 may include additional systems (not illustrated) such as an air induction system, a recirculation loop, cooling systems, and other support systems for the engine block 102 and the plurality of cylinders 104.

The exhaust line 110 may be fluidly connected to one or more components that condition and direct exhaust from the plurality of cylinders 104 to the atmosphere. For example, the exhaust line 110 may be connected to the SCR system 124, one or more turbines driven by the exhaust flowing through the exhaust line 110, a particulate filter device located downstream of the one or more turbines, and other exhaust treatment devices that are associated with the exhaust line 110 and the SCR system 124. It is contemplated that the exhaust line 110 may be connected to and/or associated with different or additional components than described above such as, for example, bypass components, an exhaust compression or restriction brake, an attenuation component, additional exhaust treatment devices, and other known components, if desired.

The SCR system 124 may receive exhaust from the plurality of cylinders 104 and reduce constituents of the exhaust to innocuous gases. In the example shown in FIG. 1, the SCR system 124 is disposed downstream of engine block 102. Additionally, the exhaust line 110 may provide the exhaust to a particulate filter and/or other exhaust treatment systems before the SCR system 124. In any of the examples described herein, the SCR system 124 may include one or more treatment units that are comprised of a metal mesh, a ceramic honeycomb medium, and/or any other filtering medium coated with a reduction catalyst. In some examples, a gaseous or liquid diesel exhaust fluid (DEF) may be sprayed or otherwise advanced into the exhaust upstream of the one or more treatment units by a DEF injection nozzle. As the DEF is absorbed onto the surface of the one or more treatment units, the DEF may react with NOx (NO and NO$_2$) in the exhaust gas to form water (H$_2$O) and elemental nitrogen (N$_2$). In some embodiments, the catalytic compound(s) disposed on the one or more treatment units is configured to promote even distribution and conversion of the pollutants and/or the DEF.

In some examples, the fuel tank 106 may be configured to store a primary fuel that may be converted into a pilot fuel for the plurality of cylinders 104. In particular, the plurality of cylinders 104 can be configured to cyclically operate to consume the pilot fuel and the primary fuel while producing power. More specifically, the primary fuel and the pilot fuel can be provided to the plurality of cylinders 104 and combusted to drive internal components (e.g., piston assemblies) of the plurality of cylinders 104 that generate power for systems associated with the power system 100. Additionally, the fuel tank 106 can be fluidly connected to the pilot fuel pump 120 and the primary fuel pump 122 such that the primary fuel stored by the fuel tank 106 is extracted from the fluid tank and provided, at a first flow rate and a second flow rate, to the continuous reactor 116 and the plurality of cylinders 104. Accordingly, the primary fuel stored by the fuel tank 106 can be utilized to drive the plurality of cylinders 104 during operation of the power system 100 and to generate the pilot fuel that ignites the primary fuel for each cycle of the plurality of cylinders 104.

In some examples, the plurality of cylinders 104 are configured to receive a first amount of the pilot fuel via the pilot fuel line 112 and a second amount of the primary fuel via the primary fuel line 114. More specifically, the plurality of cylinders 104 can be configured as compression ignition (CI) cylinders and/or spark ignition (SI) cylinders. Additionally, CI cylinders are configured to ignite a pilot fuel with a cetane value that is high enough to enable the CI cylinders to compress and ignite the pilot fuel and initiate the combustion of the primary fuel. It should be noted that a first type of CI cylinders (e.g., such as those found in diesel engines) utilize a single fuel to drive the engine while a second type of CI cylinders (e.g., such as those found in methanol engines) utilize the pilot fuel to initiate combustion and the primary fuel to drive the engine. For example, diesel engines commonly consume fuels that have a cetane number between 40 and 55. Further, the CI cylinders can utilize pilot fuels with cetane numbers over a threshold value to initiate combustion of primary fuels with cetane numbers below the threshold value, wherein the threshold value indicates whether a fuel can be ignited by the CI cylinders. Accordingly, the plurality of cylinders 104 can be configured as CI cylinders, wherein the primary fuel is selected to enable the engine block 102 to generate and output power and the pilot fuel is selected to enable the plurality of cylinders to ignite the primary fuel through compression ignition.

In some examples, the primary fuel and the pilot fuel can be selected based at least on the primary fuel being convertible to generate the pilot fuel within the power system 100. For example, methanol is a primary fuel that may be converted, via the continuous reactor 116 and/or another reactor associated with the power system 100 (e.g., a batch reactor, a secondary reactor, etc.), to generate dimethyl ether, wherein dimethyl ether may be ignited as a pilot fuel by the power system 100. In particular, methanol may be converted to dimethyl ether via a dehydration reaction, wherein methanol is be passed over a catalytic bed and converted into dimethyl ether and water. As will be discussed in greater detail below, the continuous reactor 116 may be configured to receive a first amount of methanol, convert a portion of the first amount of methanol into a second amount of dimethyl ether and a third amount of water, and output a fourth amount of methanol (e.g., unreacted methanol), the second amount of dimethyl ether, and the third amount of water. Additionally, the continuous reactor 116 can utilize a variety of catalyst beds, catalyst blocks, and other forms of catalysts to enable and/or improve the conversion rate from methanol to dimethyl ether. Further, while the above examples discuss a specific primary fuel (e.g., methanol) and a specific pilot fuel (e.g., dimethyl ether), the pilot fuel selected for the power system 100 may be selected based on a conversion reaction that generates the pilot fuel.

Additionally, the conversion of methanol to form dimethyl ether and water may proceed according to the below reaction:

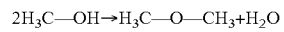

$$2H_3C\text{—}OH \rightarrow H_3C\text{—}O\text{—}CH_3 + H_2O$$

The above reaction is a reversible reaction that may proceed to an equilibrium state where the fourth amount of methanol is in equilibrium with the second amount of dimethyl ether and the third amount of water. In particular, the continuous reactor 116 may be configured to include a reaction catalyst that is selected to favor the forward reaction of methanol to dimethyl ether over the reverse reaction of dimethyl ether to water. For example, the reactor catalyst may be selected from an aluminum oxide catalyst, a titanium oxide catalyst, a zirconium oxide catalyst, a platinum catalyst, a zeolite catalyst, and/or other catalyst that enables the dehydration reaction and/or selectively produces dimethyl ether. Further, the reactor catalyst may be selected to reduce the activation energy and/or the operating temperature of the continuous reactor 116, to increase the conversion rate of methanol to dimethyl ether within the continuous reactor 116, to select for the dehydration reaction that produces dimethyl ether, and/or other operating variables that may impact operation of the continuous reactor 116. Beyond modifying the reactor catalyst, a reactor diameter, a reactor length, catalyst bed dimensions, operating pressure, operating temperature, and methanol flow rate may be selected to define operation of the continuous reactor 116. The reactor diameter may define a maximum flow rate through the continuous reactor 116, while the reactor length and the catalyst bed dimensions may define the second amount of dimethyl ether produced from the first amount of methanol entering the continuous reactor 116. Similarly, the operating pressure and/or the operating temperature of the continuous reactor 116 may define the second amount of dimethyl ether produced, the selectivity for the dehydration reaction, and other operating variables of the continuous reactor 116.

In some examples, the pilot fuel pump 120 can be fluidly connected to the fuel tank 106 via a pilot fuel port 128 that enables a first amount of the primary fuel to be extracted from the fuel tank 106. Additionally, the first amount of the primary fuel can be provided to the continuous reactor 116 via a reactor feed line 118 such that the continuous reactor 116 generates a second amount of the pilot fuel and a third amount of the byproduct. It should be noted that for a first flow rate of the primary fuel through the continuous reactor 116 can convert the primary fuel into the pilot fuel at a conversion rate such that the first amount of the primary fuel entering the continuous reactor 116 causes the continuous reactor to output the second amount of the pilot fuel, the third amount of the byproduct, and a fourth amount of the primary fuel (e.g., the primary fuel that was not converted into the pilot fuel). As noted above, the conversion rate of the continuous reactor 116 can be impacted by the first flow rate of the primary fuel into the continuous reactor 116, a reactor temperature of the continuous reactor 116, an input temperature of the first amount of the primary fuel, a reactor catalyst of the continuous reactor 116, and other variables that impact conversion of the primary fuel into the pilot fuel. Accordingly, the pilot fuel pump 120 can be operated to direct the first amount of the primary fuel from the fuel tank 106 to the continuous reactor 116 such that the second amount of the pilot fuel is generated by the continuous reactor 116 and provided to the plurality of cylinders 104 via the pilot fuel line 112.

In some examples, the primary fuel pump 122 can be fluidly connected to the fuel tank 106 via a primary fuel port 130 that enables an amount of the primary fuel to be extracted from the fuel tank 106 and provided to the plurality of cylinders 104 via the primary fuel line 114. In particular, the primary fuel pump 122 can be configured to extract the amount of the primary fuel that, when provided to the plurality of cylinders 104, enables the engine block 102 to provide sufficient power to satisfy a power demand of one or more associated systems. For example, the power demand can be associated with operating a drive system of a vehicle, a hydraulic pump for a hydraulics system, a generator, and/or other systems that may receive power from the engine block 102. Additionally, the amount of the primary fuel that is provided to and consumed by the plurality of cylinders 104 may be utilized to determine the second amount of pilot fuel to be provided to the plurality of cylinders 104 via the pilot fuel line 112. More specifically, the amount of the primary fuel that is extracted by the primary fuel pump 122 may determine the first amount of the primary fuel provided to the continuous reactor 116 such that the second amount of the pilot fuel generated by the continuous reactor 116 is sufficient to initiate combustion of the amount of primary fuel provided by the primary fuel line 114 and the primary fuel pump 122. Further, and as described in greater detail below, the amount of the primary fuel provided and the second amount of the pilot fuel provided may be determined and/or modified to ensure complete combustion of the primary fuel while maintaining power generation by the plurality of cylinders 104.

Accordingly, the continuous reactor 116 can be implemented to simplify the power system 100 such that a secondary tank is not included to store the pilot fuel for the engine block 102 and the plurality of cylinders 104. In particular, utilization of the primary fuel to both drive the power system 100 and generate the pilot fuel for initiating combustion within the plurality of cylinders 104 eliminates the secondary tank that would store and provide the pilot fuel independent of the primary fuel. Further, utilization of the pilot fuel that is synthesized from the primary fuel, such as dimethyl ether from methanol, may result in the pilot fuel burning cleaner than other pilot fuels that are commonly used, such as diesel.

Figure 2:
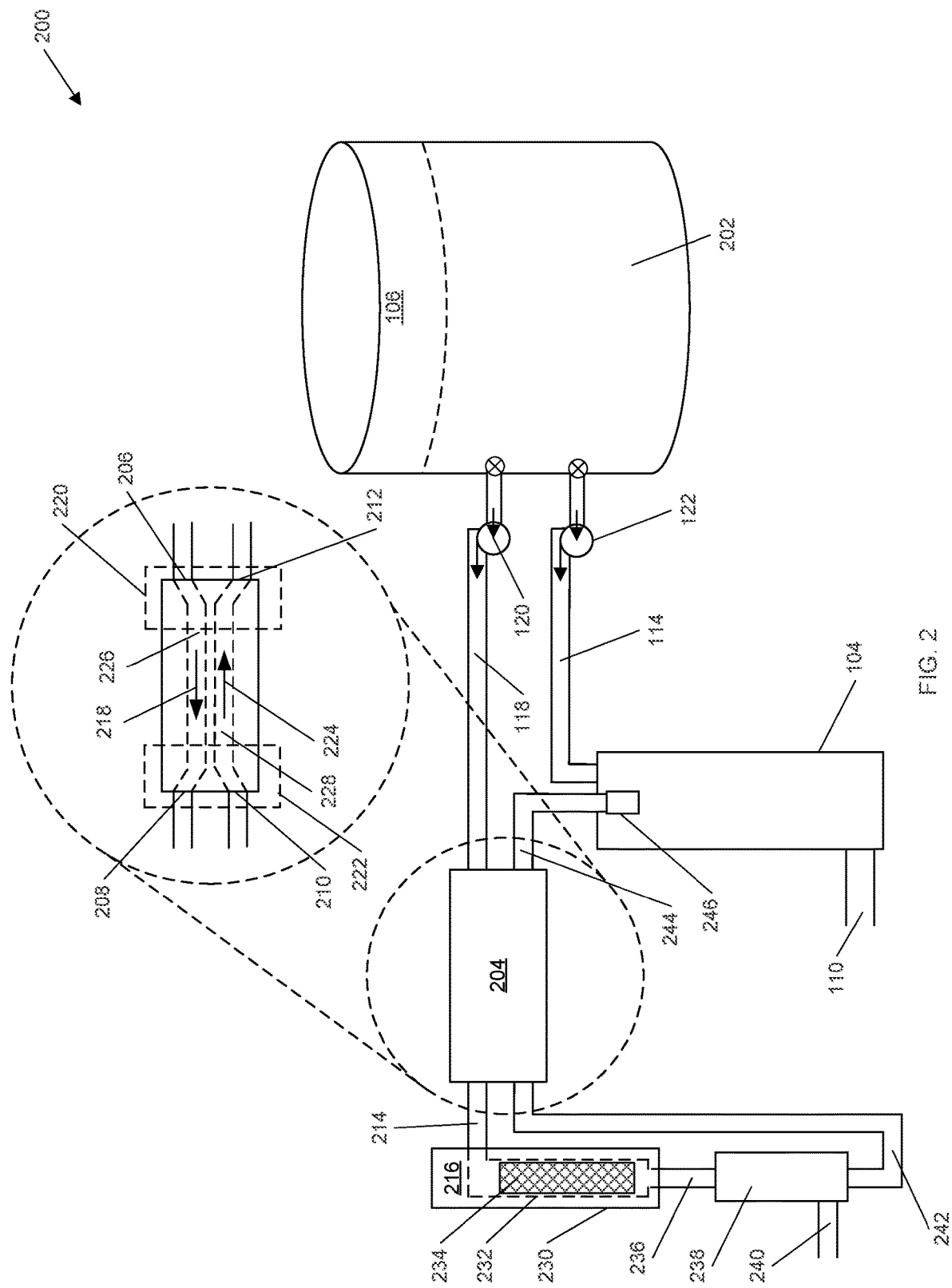
FIG. 2 is an illustration of pilot fuel system that is configured to convert a primary fuel to a pilot fuel via a dehydration reactor and purify the pilot fuel via a purification system according to examples of the present disclosure.

FIG. 2 illustrates a pilot fuel system 200 that is configured to generate the pilot fuel from the primary fuel and provide the pilot fuel to the power system 100. The pilot fuel system 200 can include one or more support systems that are associated with the continuous reactor 116. Additionally, the one or more support systems may be configured to modify operation of the continuous reactor 116 and output of the pilot fuel. For the purposes of this disclosure, the pilot fuel system 200 is depicted and described as including a dehydration system that receives liquid methanol from the fuel tank 106 and converts the liquid methanol into dimethyl ether via a dehydration reaction. However, it is contemplated that the pilot fuel system 200 may be configured to receive a liquid primary fuel 202 from the fuel tank 106 and convert the liquid primary fuel 202 to the pilot fuel via dehydration reaction(s), substitution reaction(s), elimination reaction(s), and/or other types of reactions that produce a pilot fuel species with a sufficiently high cetane value to initiate combustion of the liquid primary fuel 202 within the power system 100.

In some examples, the liquid primary fuel 202 can be obtained from the fuel tank 106 by the primary fuel pump 122 and provided, via the feed line 118, to a heat exchanger 204. In particular, the liquid primary fuel 202 can be provided to the heat exchanger 204 via a first fluid input 206 and output by the heat exchanger 204 via a first fluid output 210. Similarly, fluid output by the dehydration reactor 216 can be received at a second fluid input 208 and output via a second fluid output 212. More specifically, the liquid primary fuel 202 can be stored within the fuel tank 106, obtained by the pilot fuel pump 120, and provided via the feed line 118 at a first temperature that is approximately equal to an ambient temperature. Additionally, the liquid fuel 202 can enter the heat exchanger 204 in a first direction 218 via the first fluid input 206, receive thermal energy that increases the temperature of the liquid fuel 202 from the first temperature to a second temperature, and exit the heat exchanger 204 via the first fluid output 210. The heat exchanger 204 may be configured to transfer thermal energy from the fluid that passes from the second fluid input 208 to the second fluid output 212 to the liquid fuel 202, causing the increase in temperature from the first temperature to the second temperature.

In some additional examples, and as noted above, the heat exchanger 204 may be configured to transfer thermal energy to the liquid fuel 202 such that the liquid fuel 202 is provided to the dehydration reactor 216 at the second temperature via an output line 214 of the heat exchanger 204. In particular, the heat exchanger 204 can be configured to provide thermal energy sufficient to increase the temperature of the liquid fuel 202 from the first temperature to the second temperature. Further, the heat exchanger 204 can be configured to transfer thermal energy from a working fluid to the liquid fuel 202. It should be noted that the working fluid may be the fluid output by the dehydration reactor 216, the fluid output by the purification system 238, a heated fluid obtained from a reservoir, and/or other fluid that provides thermal energy to the liquid fuel 202 via the heat exchanger 204. Additionally, the second temperature may be an input temperature for the dehydration reactor 216 that enables conversion of the liquid fuel 202 to the pilot fuel. The fluid received from the dehydration reactor may be utilized as a thermal energy source by the heat exchanger 204 to cause the increase from the first temperature to the second temperature. Alternatively, or in addition, the heat exchanger 204 can be configured to increase the temperature of the liquid fuel 202 from the first temperature to an intermediate temperature, wherein the heat exchanger 204 is in fluid communication with a heating system and/or a cooling system (not illustrated) that further modifies the temperature of the liquid fuel 202 from the intermediate temperature to the second temperature. Additionally, the heat exchanger 204 can be configured as a parallel flow, a counter flow, and/or a cross flow heat exchanger.

In at least one example, the heat exchanger 204 can be a counter flow heat exchanger as illustrated by FIG. 2. In particular, a first amount of the liquid fuel 202 can enter the heat exchanger 204 via the first fluid input 206 on a first side 220 (or in proximity to the first side 220) and exit the heat exchanger 204 via the first fluid output 210 on a second side 222 (or in proximity to the second side 222). Additionally, a second amount of the fluid output by the dehydration reactor 216 can enter the heat exchanger 204 via the second fluid input 208 on the second side 222 (or in proximity to the second side 222) and exit the heat exchanger 204 via the second fluid output 212 on the first side 220 (or in proximity to the first side 220). More specifically, the first amount of the liquid fuel 202 travels along a first fluid path 226 in the first direction 218 (indicated by a first arrow labeled 218) that is substantially opposite a second direction 224 (indicated by a second arrow labeled 224) that the second amount of the fluid traverses via a second fluid path 228. Further, and based at least on the first direction 218 and the second direction 224 being opposite, a first fluid temperature of the first amount of liquid fuel 202 may approach a first maximum temperature (e.g., the highest temperature that the liquid fuel 202 will reach within the heat exchanger 204) as it reaches the second side 222 of the heat exchanger 204 (e.g., due to the fluid being at a second maximum temperature that is the highest temperature the fluid will reach within the heat exchanger 204). Similarly, the first fluid temperature of the liquid fuel 202 will be at a first minimum temperature at the first side 220 of the heat exchanger 204 where a second fluid temperature of the fluid is at a second minimum temperature. Accordingly, as the liquid fuel 202 traverses the heat exchanger 204 from the first fluid input 206 to the first fluid output 210, the first fluid temperature of the liquid fuel 202 approaches will be increased from the first temperature to the second temperature by the thermal energy received from the second amount of the fluid.

In at least one additional example, the heat exchanger 204 can be a parallel flow heat exchanger (not illustrated) where the first fluid input 206 and the second fluid input 208 are located on the first side 220 of the heat exchanger 204 and/or are located in proximity to the first side 220 of the heat exchanger 204. Additionally, the first fluid output 210 and the second fluid output 212 are located on the second side 222 of the heat exchanger 204 and/or are located in proximity to the second side 222 of the heat exchanger 204. In particular, the parallel flow configuration causes the liquid fuel 202 that enters the first fluid input 206 and exits the first fluid output 210 to traverse the first fluid path 226 in substantially the same direction as the second direction 224 of the fluid entering the second fluid input 208 and exiting the second fluid output 212 via the second fluid path 228. Additionally, while configured as a parallel flow heat exchanger, the heat exchanger 204 may be configured such that a minimum temperature point (e.g., a point in the first fluid path 226 that has a fluid temperature that is a lowest temperature on the first fluid path 226) of the first amount of the liquid fuel 202 receives thermal energy from a maximum temperature point (e.g., a point in the second fluid path 228 that is a highest temperature on the second fluid path 228) of the second amount of the fluid. Accordingly, as the liquid fuel 202 traverses the heat exchanger 204 from the first fluid input 206 to the first fluid output 210, the fluid temperature of the liquid fuel 202 approaches the temperature of the fluid traversing the heat exchanger 204 from the second fluid input 208 to the second fluid output 212.

In at least one further example, the heat exchanger 204 can be configured to receive the fluid output by the dehydration reactor 216 (e.g., the heat exchanger 204 is in fluid communication with the reactor output 236) and/or the purification system 238 (e.g., the heat exchanger 204 is in fluid communication with the pilot fuel output 242) and cause the fluid to be condensed into a liquid. In particular, the heat exchanger 204 can be configured to reduce the fluid from an output temperature associated with the dehydration reactor 216 (or purification system 238) to a condensation temperature for the fluid (e.g., a temperature, at a pressure, that the fluid transitions from the gaseous phase to the liquid phase, wherein a temperature sensor can be associated with the heat exchanger 204 to monitor the output temperature). Alternatively, or in addition, the heat exchanger 204 can be configured to reduce a fluid temperature associated with the fluid prior to the fluid being provided to a condensation system. Accordingly, thermal energy can be extracted from the fluid, via the heat exchanger 204 and/or a liquefaction system, such that the fluid output by the dehydration reactor 216 and/or the purification system 238 is provided to the plurality of cylinders 104 as in the liquid phase. Additionally, the liquefaction system may be configured as a cooling system that provides refrigeration for the fluid and/or a pressurizing system (e.g., a pump, a compressor, etc.) that pressurizes the fluid to cause condensation of the pilot fuel into the liquid phase. In any such examples, the heat exchanger 204 and/or the liquefaction system can be configured to ensure that the pilot fuel is provided to the plurality of cylinders 104 in the liquid fuel as a subcooled liquid (e.g., the pilot fuel is cooled to ensure that the pilot fuel is to temperatures and/or pressures that substantially prevent the pilot fuel from entering the gaseous phase and/or existing as a split phase solution).

In some examples, the heat exchanger 204 can receive the liquid fuel 202 and provide the liquid fuel 202 to the dehydration reactor 216 at an input temperature. The input temperature can be determined based at least on a catalyst of the dehydration reactor 216, a conversion target for the dehydration reactor 216, and other process variables of the dehydration reactor 216 (e.g., fouling concerns, catalyst operating ranges, side reactions, etc.). Additionally, the input temperature of the dehydration reactor 216 may change in response to modified operation requirements of the power system 100. Further, the input temperature may influence operation of the heat exchanger 204, the pilot fuel pump 120, fuel heating elements, fluid cooling elements, and other systems within the power system 100. It should be noted that fluctuations in the operation of the power system 100 may cascade down into a variety of control options that modify operation of the pilot fuel system 200 such that flow rates through the heat exchanger 204, heating loads for the heat exchanger 204 and other heating systems, cooling loads for cooling systems, and other variables shift to provide the liquid fuel 202 to the dehydration reactor 216 at the input temperature. For example, modifying the first amount of the liquid fuel 202 through the heat exchanger 204 (e.g., by modifying the operating speed of the pilot fuel pump 120) may cause the liquid fuel 202 to be increased from the first temperature at the first fluid input 206 to the second temperature at the first fluid output 210, wherein the second temperature is reduced due to the increased flow rate through the heat exchanger 204. In response, a heating system may be utilized to increase the liquid fuel 202 from the second temperature to the input temperature of the dehydration reactor 216. Accordingly, and as discussed in more detail below, the heat exchanger 204 and other temperature modifying systems may be configured to provide the liquid fuel 202 to the dehydration reactor 216 at the input temperature.

Accordingly, the heat exchanger 204 can be configured to increase the fluid temperature of the liquid fuel 202 flowing in the first direction 218 and to decrease a pilot fuel temperature of the pilot fuel flowing in the second direction 224. In particular, the heat exchanger 204 can at least partially increase the fluid temperature of the liquid fuel 202 to the input temperature of the dehydration reactor 216. Additionally, the heat exchanger 204 can at least partially decrease the fuel temperature of the pilot fuel such that an aqueous solution of the pilot fuel, the byproduct, and the remnant liquid fuel 202 may be provided to the plurality of cylinders 104. For example, the heat exchanger 204 can at least partially condense the pilot fuel and byproduct mixture to form the aqueous solution that may be injected, via the pilot fuel injector 246, into the plurality of cylinders 104.

In some examples, the dehydration reactor 216 is configured to sustain a substantially continuous dehydration reaction that converts the liquid fuel 202 to the pilot fuel that is consumed by the plurality of cylinders 104 to initiate combustion of the primary fuel. For example, and as noted above, the dehydration reactor 216 can be configured to consume methanol as the primary fuel and output dimethyl ether as the pilot fuel and water as a byproduct. In particular, the dehydration reactor 216 can be configured to include a reactor wall 230 that encloses a reactor channel 232, wherein one or more catalyst structures 234 are placed within the reactor channel 232. The reactor wall 230 can be configured to define a cylindrical, cuboid, polygonal prism, or other three-dimensional structure for the dehydration reactor 216. Additionally, the reactor wall 230 can be configured to provide structural support for the reactor channel 232 and the one or more catalyst structures 234. For example, an inner surface of the reactor wall 230 may be configured to enclose the reactor channel 232 such that the liquid fuel 202 received via the output line 214 of the heat exchanger 204 is directed through the reactor channel 232 and to a reactor output 236. Alternatively, or in addition, a reactor channel wall may be configured to enclose the reactor channel 232, receive the liquid fuel via the output line 214 of the heat exchanger 204, and direct the liquid fuel 202 through the reactor channel 232, and output the reacted fluid (e.g., a solution of the pilot fuel, remnant primary fuel, and byproducts from the conversion reaction) to a reactor output 236. Further, the one or more catalyst structures 234 can be secured to inner surface of the reactor wall 230 and/or the reactor channel wall such that the liquid fuel 202 entering the dehydration reactor 216 is directed through the one or more catalyst structures 234 and prevented from exiting the reactor channel 232 without passing through the one or more catalyst structures 234.

In some examples, the one or more catalyst structures 234 are configured to catalyze the dehydration reaction of the liquid fuel 202 to form the pilot fuel and the byproduct(s). It should be noted that the byproduct(s) can be benign species that may be passed into the plurality of cylinders 104 and/or removable species that are removed from the reacted fluid before providing the reacted fluid to the plurality of cylinders 104. The removable species can be removed from the reacted fluid based at least on the removable species potentially damaging the power system 100, inhibit the combustion of the primary fuel, foul the systems of the power system 100, and/or otherwise exhibit detrimental effects for the power system 100. In contrast, the benign species may be chemical species that may enter the plurality of cylinders 104 and combust and/or pass through the plurality of cylinders 104 with minimal negative effect and/or with improved operation of the power system 100. For example, where methanol is the primary fuel and is utilized to generate dimethyl ether as the pilot fuel, water is produced as a byproduct. Additionally, while water does absorb thermal energy generated by combustion (e.g., water does not combust and absorbs thermal energy due to heating and evaporation of the water), water also reduces pollutants that are generated by combustion of dimethyl ether and methanol. Reducing the pollutants generated by combustion of the primary fuel and the pilot fuel also reduces the size of exhaust treating components (e.g., the SCR system 124) and improves the environmental impact of the power system 100. Accordingly, water may be passed from the dehydration reactor 216 to the plurality of cylinders 104 without being removed from the reacted fluids generated by the dehydration reactor. Alternatively, or in addition, a first portion of the water generated by the dehydration reactor 216 may remain in solution with the primary fuel and the pilot fuel while a second portion of the water generated is removed from the primary fuel and the pilot fuel.

In some examples, the dehydration reactor 216 may be a continuous reactor that is configured to continuously receive the first amount of the liquid fuel 202. Additionally, the dehydration reactor 216, and the one or more catalyst structures 234, may be configured such that the first amount of the liquid fuel 202 is at least partially converted to the pilot fuel. In particular, the dehydration reactor 216 and the one or more catalyst structures 234 can be configured to achieve a conversion percentage of the liquid fuel 202 that traverses a length of the reactor channel 232 before being output via the reactor output line 236. Further, the dehydration reactor 216 may be configured to achieve conversion of the liquid fuel 202 to the pilot fuel above a conversion threshold for a flow rate range and an input temperature range that is associated with an operating window for the power system 100. For example, and while the liquid fuel 202 is within the input temperature range, the dehydration reactor 216 can be configured to drive conversion of the liquid fuel 202 to the pilot fuel towards completion (e.g., greater than 95% of the liquid fuel 202 from the first amount is converted to the primary fuel). Similarly, and while the first amount of the liquid fuel 202 is less than a threshold amount, the dehydration reactor 216 can be configured to drive conversion of the liquid fuel 202 to the pilot fuel towards completion.

In some examples, the reacted fluid generated from the liquid fuel 202 can be provided to a byproduct processing system 238 via the reactor output 236. In particular, the byproduct processing system 238 can be utilized to regulate an amount of byproducts that are provided to the plurality of cylinders 104 in solution with the pilot fuel and/or the primary fuel. As noted above, the byproducts produced by converting the liquid fuel 202 to the pilot fuel may be benign species that may be provided to the plurality of cylinders 104 and removable species that are extracted from the reacted fluid before the pilot fuel is provided to the plurality of cylinders 104. Accordingly, the byproduct processing system 238 can be utilized to regulate the amount of benign species and substantially eliminate removable species. Further, the byproduct processing system 238 can be configured as a distillation system, a filtration system, a centrifugation system, a fractionation system, and/or other purification system that is configured to regulate and/or remove byproducts from the reacted fluid. It should be noted that the byproduct processing system 238 can be configured to purify single-phase solutions, multi-phase solutions, emulsions, and other fluid mixtures that are generated by the dehydration reactor 216 (or the continuous reactor 116).

In at least one example, the reacted fluid generated by the dehydration reactor 216 can be a single-phase solution that includes a mixture of methanol, dimethyl ether, and water. It should be noted that while water may be provided to the plurality of cylinders 104 with minimal negative effects and/or positive effects on operation of the power system 100, in some configurations it may be desirable to regulate the amount of water in the reacted fluid. Accordingly, the byproduct processing system 238 may be a distillation system that is configured to extract a first portion of the water from the reacted fluid while providing a second portion of the water, via the reacted fluid, to the plurality of cylinders 104. Additionally, the first portion of water (optionally with an amount of the pilot fuel and an additional amount of the primary fuel) may be output via a byproduct output 240 while the pilot fuel (e.g., dimethyl ether), the primary fuel (e.g., methanol), and the second portion of water may be provided to the plurality of cylinders 104 via a pilot fuel output 242. It should be noted that the pilot fuel output 242 may be configured to direct the reacted fluid to the heat exchanger 204 via the second fluid input 210 as discussed above. The heat exchanger 204 may reduce the fluid temperature of the reacted fluid from an output temperature of the byproduct processing system 238 (or the dehydration reactor 216 where the heat exchanger receives the reacted fuel via the reactor output 236) to an input temperature for the plurality of cylinders 104. Further, the byproduct output 240 may be combined with the primary fuel within the primary fuel line 114 to reduce waste outputs and/or fully utilize the reacted fluid output by the dehydration reactor 216.

In some examples, the pilot fuel, remnant primary fuel (e.g., the primary fuel that was not converted into the pilot fuel), and the byproduct(s) may be provided to the plurality of cylinders 104 via a pilot fuel feed line 244 that is connected to a pilot fuel injector 246. In particular, the pilot fuel injector 246 may be configured to receive at least the pilot fuel, inject the pilot fuel into the cylinder 104, and initiate combustion of the primary fuel that is provided via the primary fuel line 114. As will be discussed in greater detail below, a timing of pilot fuel injection and combustion initiation may be modified such that combustion of the primary fuel is driven toward a faster combustion rate or a slower combustion rate based at least on operation of the power system 100. Additionally, the primary fuel may be provided via a primary fuel injector to the plurality of cylinders 104. The primary fuel injector and the pilot fuel injector may be configured as independent structures, wherein the primary fuel injector and the pilot fuel injector 246 can be independently configured as mechanical, pneumatic, hydraulic, or other injection mechanisms. Additionally, the primary fuel injector and the pilot fuel injector 246 may be disposed within a primary fuel injector housing and/or a pilot fuel injector housing, respectively. Alternatively, the primary fuel injector and the pilot fuel injector may be disposed within a single fuel injector housing, wherein the primary fuel injector and the pilot fuel injector are injection mechanisms that are disposed within the fuel injector housing to provide the pilot fuel and the primary fuel to the associated cylinder.

In some examples, not illustrated by FIG. 2, the pilot fuel feed line 244 and the pilot fuel injector 246 may be fluidly connected to an input air line such that the liquid pilot fuel is injected into air that is provided to the plurality of cylinders 104. In particular, the input air line may be connected to an air pump and/or a compressor (or other oxygen source) that obtains the air and provides the air into the plurality of cylinders to enable the combustion reaction. Additionally, the pilot fuel injector 246 may be connected to the input air line such that the pilot fuel is sprayed into and/or aerosolized with the air being provided to the plurality of cylinders 104. Accordingly, the pilot fuel may be provided to the plurality of cylinders 104 via the input air line, wherein the pilot fuel is dispersed into the air as droplets that are then provided to the plurality of cylinders 104 and combusted.

Figure 3:
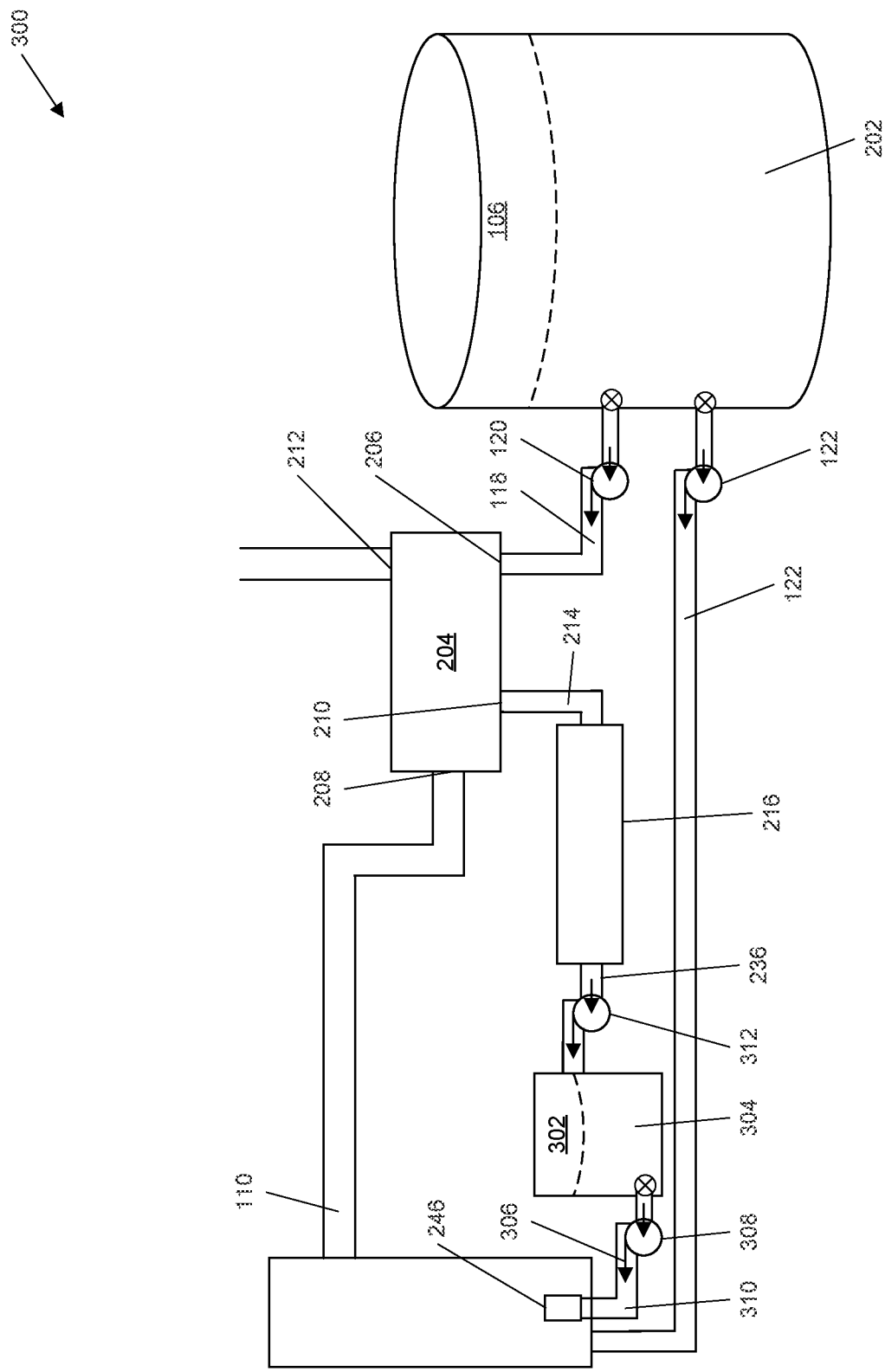
FIG. 3 is an illustration of a pilot fuel system that is configured to convert a primary fuel to a pilot fuel via a dehydration reactor and maintain an amount of the pilot fuel within a buffer tank that partially isolates pilot fuel production from pilot fuel consumption.

FIG. 3 illustrates a pilot fuel system 300 that is configured to generate the pilot fuel from the primary fuel and provide the pilot fuel to the power system 100. In particular, the pilot fuel system 300 may include an in-line buffer tank 302 that is configured to store an amount 304 of the pilot fuel that is generated by the continuous reactor 116 and/or the dehydration reactor 216. It should be noted that the amount 304 of the pilot fuel may be an amount of an aqueous solution that includes the pilot fuel (e.g., dimethyl ether), a byproduct (e.g., water from the dehydration reaction), and remnant primary fuel (e.g., methanol). Additionally, the pilot fuel system 300 may include one or more support systems that are associated with the continuous reactor 116 and/or the dehydration reactor 216. For the purposes of this disclosure, the pilot fuel system 300 will commonly be described as including the dehydration reactor 216 that receives liquid methanol from the fuel tank 106 and converts the liquid methanol into dimethyl ether via a dehydration reaction. However, it is contemplated that the pilot fuel system 300 may be configured to receive the liquid primary fuel 202 from the fuel tank 106 and convert the liquid primary fuel 202 to the pilot fuel. The conversion to the pilot fuel may occur via dehydration reaction(s), substitution reaction(s), elimination reaction(s), and/or other types of reactions that produce a pilot fuel species with a sufficiently high cetane number to initiate combustion of the liquid primary fuel 202.

In some examples, the heat exchanger 204 and the dehydration reactor 216 can be configured such that the liquid fuel 202 is provided to the dehydration reactor 216 at the input temperature of the dehydration reactor 216. Additionally, the heat exchanger 204 can be configured to transfer thermal energy to the liquid fuel 202 from the fluid output by the dehydration reactor 216, the exhaust output by the plurality of cylinders 104, and/or other fluids that have a temperature that is greater than the first temperature associated with the liquid fuel 202. Accordingly, the dehydration reactor 216 can generate the pilot fuel from the liquid fuel 202.

In some examples, the dehydration reactor 216 can generate the pilot fuel and provide the amount 304 of the pilot fuel to a buffer tank 302. In particular, the pilot fuel system can be configured to store the amount 304 of the pilot fuel in the buffer tank 302 such that operation of the dehydration reactor 216 is decoupled from operation of the plurality of cylinders 104 and the power system 100. More specifically, as power demands fluctuate for the power system 100, the plurality of cylinders can be configured to receive a variable amount of the pilot fuel that initiates combustion of the primary fuel. It should be noted that the variable amount of the pilot fuel may be provided, via a variable flow rate in a direction 306, from the buffer tank 302 to the plurality of cylinders 104. Additionally, the dehydration reactor 216 can be configured to produce and maintain the amount 304 of the pilot fuel within the buffer tank 302 such that the variable amount of the pilot fuel demanded by the plurality of cylinders 104 may be continuously provided to the plurality of cylinders 104. Further, the buffer tank 302 may be configured to maintain the amount 304 of the pilot fuel and provide the variable amount of the pilot fuel such that the dehydration reactor 216 may operate at substantially steady state, substantially independent of the variable amount provided to the plurality of cylinders 104.

In some examples, the buffer tank 302 can be configured to store the pilot fuel generated by the dehydration reactor 216, wherein the buffer tank 302 may be configured to store the primary fuel as a liquified fluid (e.g., under internal pressures high enough to condense the pilot fuel and/or byproducts of the dehydration reactor) and/or as a compressed gas. In particular, the buffer tank 302 may be configured to store the amount 304 of the pilot fuel generated by the dehydration reactor 216 under internal conditions (e.g., internal temperature, internal pressure, etc.) that enable the amount 304 of the pilot fuel to be effective held before transfer to the plurality of cylinders. Additionally, the buffer tank 302 can be a cylindrical tank including a fluid input (e.g., a first port, hole, and/or other opening) that is configured to receive the pilot fuel from the dehydration reactor 216. Further, the buffer tank 302 can include a fluid output that is in fluid communication with a buffer tank pump 308 configured to obtain the pilot fuel from the buffer tank 302 and provide the pilot fuel to the plurality of cylinders 104. Additionally, the buffer tank 302 may comprise a first hemi-spherical end and a second hemi-spherical end that, together, cap the ends of a cylinder, providing a cylindrical vessel with spherical end caps. More specifically, the first end can be a top of the buffer tank 302 that is opposite the second end, wherein the second end is a base of the buffer tank 302. It should be noted that the buffer tank 302 can be configured into any three-dimensional shape such that the buffer tank 302 may be a spherical tank, a cuboid tank, and/or other three-dimensional shape. Accordingly, and independent of the specific configuration, the buffer tank 302 can comprise an interior space within and/or otherwise defined by one or more tank walls to contain and store the amount 304 of the pilot fuel. Further, the buffer tank 302 may be formed from a single tank wall and/or can be formed from a plurality of components (e.g., the first end, the second end, a third wall) that may be cast from one or more materials, formed by winding a continuous fiber saturated with a thermosetting polymer (epoxy) around a "bag", secured via weld joints, secured via fasteners (e.g., screws, bolts, rivets, etc.), and/or otherwise combined to form the buffer tank 302.

In some examples, and as discussed above with respect to FIG. 2, the dehydration reactor 216 can be configured to produce, in the direction 306, the variable flow rate that provides the variable amount of the pilot fuel to the plurality of cylinders 104. The plurality of cylinders 104 may consume the variable amount of the pilot fuel to generate power and satisfy the power demand on the power system 100. In particular, and as the variable amount of the pilot fuel provided by the variable flow rate fluctuates, the dehydration reactor 216 may be configured to receive, via the feed line 118 and the output line 214, the first amount of the liquid fuel 202. The first amount of the liquid fuel may be provided at the first flow rate and is modulated via control of the pilot fuel pump 120. The first amount of the liquid fuel 202 entering the dehydration reactor 216 at the first flow rate may cause the dehydration reactor 216 to output the variable amount of the pilot fuel at the variable flow rate in response to fluctuations in the power demand of the power system 100. Additionally, the dehydration reactor 216 may be configured to produce the variable amount of the pilot fuel for a range of variable flowrates to enable power production within an operating range of the power system 100. It should be noted that direct provisioning of the variable amount by the dehydration reactor 216 may cause the variable flow rate to equal the first flow rate as the conversion from liquid fuel 202 to pilot fuel approaches complete conversion. Accordingly, the dehydration reactor 216 may be configured to receive the first amount of the liquid fuel 202 at sufficient throughput to satisfy the variable amount consumed by the plurality of cylinders 104. Further, direct provisioning of the pilot fuel by the dehydration reactor 216 may result in fluctuations in the variable amount and/or the variable flow rate being satisfied after a lead time associated with the pilot fuel pump 120. For example, and in response to an increased variable amount consumed by the power system 100, the first amount of the liquid fuel 202 provided to the dehydration reactor may be similarly increased by the pilot fuel pump 120. Accordingly, the pilot fuel pump 120 may provide sufficient liquid fuel 202 to the dehydration reactor 216, causing increased output of the pilot fuel to satisfy the increased variable amount of the pilot fuel consumed by the power system 100. Further the lead time may include the amount of time for the dehydration reactor 216 to convert the first amount of the liquid fuel 202, after the increase caused by the pilot fuel pump 120, to the pilot fuel.

It should be noted that the term "lead time" may refer to a period of time that elapses between the power system 100 changing from a first operating state to a second operating state and the pilot fuel system 300 supplying the variable amount of the pilot fuel for the second operating state (e.g., the variable amount of the pilot fuel provided to the plurality of cylinders 104 may increase or decrease, causing the dehydration reactor 216 to receive and convert an increased amount or a decreased amount of the liquid fuel 202). The lead time may be caused by the pilot fuel pump 120 obtaining the first amount of the liquid fuel 202 for the second operating state, the dehydration reactor 216 receiving the first amount for the second operating state, and/or the dehydration reactor providing the variable amount of the pilot fuel generated from the first amount for the second operating state.

In some examples, the buffer tank 302 can be configured to at least partially decouple the variable amount of the pilot fuel consumed by the plurality of cylinders 104 from operation of the dehydration reactor 216. In particular, the buffer tank 302 and a buffer tank pump 308 may be configured to provide the variable amount of the pilot fuel, via the variable flow rate in the direction 306, to the plurality of cylinders 104. Additionally, the buffer tank 302 may receive the pilot fuel produced by the dehydration reactor 216 from the first amount of the liquid fuel 202. More specifically, the pilot fuel system 300 may reduce the lead time between the power system 100 operating at the first operating state and the second operating state by reducing dependency on the dehydration reactor 216 producing the variable amount of the pilot fuel. In response to increased demand for the pilot fuel, the pilot fuel system 300 may be configured to increase variable flow rate of the pilot fuel provided by the buffer tank pump 308 from the buffer tank 302 in the direction 306. Accordingly, the plurality of cylinders 104 may receive the variable amount of the pilot fuel for the second operating state (e.g., increased amount of pilot fuel demanded) from the buffer tank 302 before and/or without the dehydration reactor 216 providing the variable amount of the pilot fuel for the second operating state. Similarly, in response to decreased demand for the pilot fuel, the pilot fuel system 300 may be configured to reduce the variable amount of the pilot fuel provided by the buffer tank pump 308 from the buffer tank 302. In response, the plurality of cylinders 104 may receive the variable amount of the pilot fuel for the second operating state (e.g., decreased amount of pilot fuel demanded) from the buffer tank 302 before and/or without the dehydration reactor 216 reducing the variable amount of the pilot fuel generated from the liquid fuel 202. Accordingly, a stored amount 304 of the pilot fuel within the buffer tank 302 may be utilized to provide increased and decreased amounts of the pilot fuel to the plurality of cylinders 104. Further, the buffer tank 302 may be utilized to satisfy an operating state of the plurality of cylinders 104 and the power system 100 independent of the pilot fuel being generated by the dehydration reactor 216.

In some examples, the dehydration reactor 216 can be configured as a continuous reactor that provides the amount 304 of the pilot fuel generated from the liquid fuel 202 to the buffer tank 302. In particular, the dehydration reactor 216 can be configured to maintain a minimum pilot fuel level for the amount 304 within the buffer tank 302 and prevent the amount 304 in the buffer tank 302 from exceeding a maximum pilot fuel level. As will be discussed in more detail regarding the control structure, the pilot fuel generated by the dehydration reactor 216 can be determined based at least on the variable amount of the pilot fuel consumed by the plurality of cylinders 104 and the amount 304 of the pilot fuel stored by the buffer tank 302. For example, the dehydration reactor 216 can be configured to, in response to increased pilot fuel consumption by the plurality of cylinders 104 (e.g., higher power output and operating speed for the power system 100), receive an increased amount of the liquid fuel 202 from the pilot fuel pump 120. Similarly, the dehydration reactor 216 can be configured to, in response to the amount 304 of the pilot fuel in the buffer tank 302 falling below a first fill threshold, receive the increased amount of the liquid fuel 202 from the pilot fuel pump 120. Additionally, the dehydration reactor 216 can be configured to, in response to decreased pilot fuel consumption by the plurality of cylinders 104 (e.g., lower power output and operating speed for the power system 100), receive a decreased amount of the liquid fuel 202 from the pilot fuel pump 120. Similarly, the dehydration reactor 216 can be configured to, in response to the amount 304 of the pilot fuel in the buffer tank 302 rising above a second fill threshold, receive the decreased amount of the liquid fuel 202 from the pilot fuel pump 120. Accordingly, the dehydration reactor 216 may be configured to convert a variable flow of the liquid fuel 202 (e.g., the first flow rate 218) to the pilot fuel based at least on the pilot fuel consumption of the plurality of cylinders 104 and the fill level of the buffer tank 302.

In some examples, the dehydration reactor 216 can be configured as a batch reactor that provides the pilot fuel generated from the liquid fuel to the buffer tank 302 on a periodic, aperiodic, scheduled, and/or other determined basis. In particular, the dehydration reactor 216 can be configured to maintain the amount 304 of the pilot fuel within the buffer tank 302 above the minimum pilot fuel level and be configured to provide the buffer tank 302 with the amount 304 of the pilot fuel. As will be discussed in more detail regarding the control structure, the pilot fuel may be generated by the dehydration reactor 216 in response to the fill level of the buffer tank 302. For example, the dehydration reactor 216 can be configured to, in response to the amount 304 of the pilot fuel within buffer tank 302 falling below the first fill threshold, initiate a batch conversion process that generates the pilot fuel to be provided to the buffer tank 302. Additionally, the batch conversion process can be configured to receive an amount of the liquid fuel 202 at the dehydration reactor 216, convert the amount of liquid fuel 202 to the pilot fuel, and provide the amount of the liquid fuel 202 to the buffer tank 302 to maintain the amount 304 of the pilot fuel. Alternatively, or in addition, the batch conversion process can be initiated after a period of time that the plurality of cylinders 104 have been in operation and/or based at least on a schedule to maintain the amount 304 of the pilot fuel. Accordingly, the batch conversion process can be configured to maintain the amount 304 of the pilot fuel within the buffer tank 302 such that the pilot fuel may be continuously provided to the plurality of cylinders 104.

In some examples, the amount 304 of the pilot fuel stored by the buffer tank 302 can be obtained by the buffer tank pump 308 and provided, via a reactor input line 310, to the plurality of cylinders 104. The reactor input line 310 may fluidly connect the buffer tank pump 308 with the plurality of cylinders 104 and/or the pilot fuel injector 246 and transfer the variable amount of the pilot fuel into the plurality of cylinders 104 at the variable flow rate. In particular, the amount 304 of the pilot fuel stored by the buffer tank 302 can be provided to the plurality of cylinders 104 independent of the dehydration reactor 216 producing the pilot fuel. Additionally, the amount 304 of the pilot fuel can be utilized for cold starting the power system 100 (e.g., initiating operation of the power system 100 below an ambient temperature threshold) due to the pilot fuel being stored and available for the plurality of cylinders 104 as a liquid. Accordingly, operating the buffer tank pump 308 can obtain the pilot fuel from the buffer tank 302 and provide the pilot fuel to the plurality of cylinders 104 to initiate operation of the power system 100.

In some examples, the pilot fuel system 300 can include a compressor 312 that is configured to receive the pilot fuel from the dehydration reactor 216 (or the heat exchanger 204 as illustrated by FIG. 2) and cause the pilot fuel to enter the liquid phase. In particular, the pilot fuel produced by the dehydration reactor may exist in the gaseous phase and/or as a mixed phase solution (e.g., a liquid phase and a gaseous phase that are in equilibrium). Additionally, the compressor 312 may be configured to increase a fluid pressure associated with the pilot fuel output by the dehydration reactor 216 such that the pilot fuel is liquified and is provided to the buffer tank 302 in the liquid phase. Further, the buffer tank 302 may be configured to contain a fluid pressure sufficient to maintain the pilot fuel in the liquid phase. Accordingly, the pilot fuel can be condensed from the gaseous phase to the liquid phase and be provided to the plurality of cylinders in the liquid phase.

In some examples, the compressor 312 can be associated with and/or replaced by a liquefaction system that is configured to cool the pilot fuel output by the dehydration reactor 216. Similar to the compressor 312, the liquefaction system can be configured to ensure that the pilot fuel is stored by the buffer tank 302 and provided to the plurality of cylinders in the liquid phase. In particular, the liquefaction system can be configured to receive the pilot fuel from the compressor 312, the dehydration reactor, and/or the heat exchanger 204 and reduce the fluid temperature of the pilot fuel. Additionally, the liquefaction system can be configured to provide the pilot fuel to the compressor 312 and/or the buffer tank 302. Accordingly, the compressor 312 and/or the liquefaction system may be configured to increase the fluid pressure and/or decrease the fluid temperature such that the pilot fuel is liquified. It should be noted that the pilot fuel may be liquified through increased fluid pressure and/or subcooled by decreased fluid temperature such that the pilot fuel is stored as a subcooled liquid.

Figure 4:
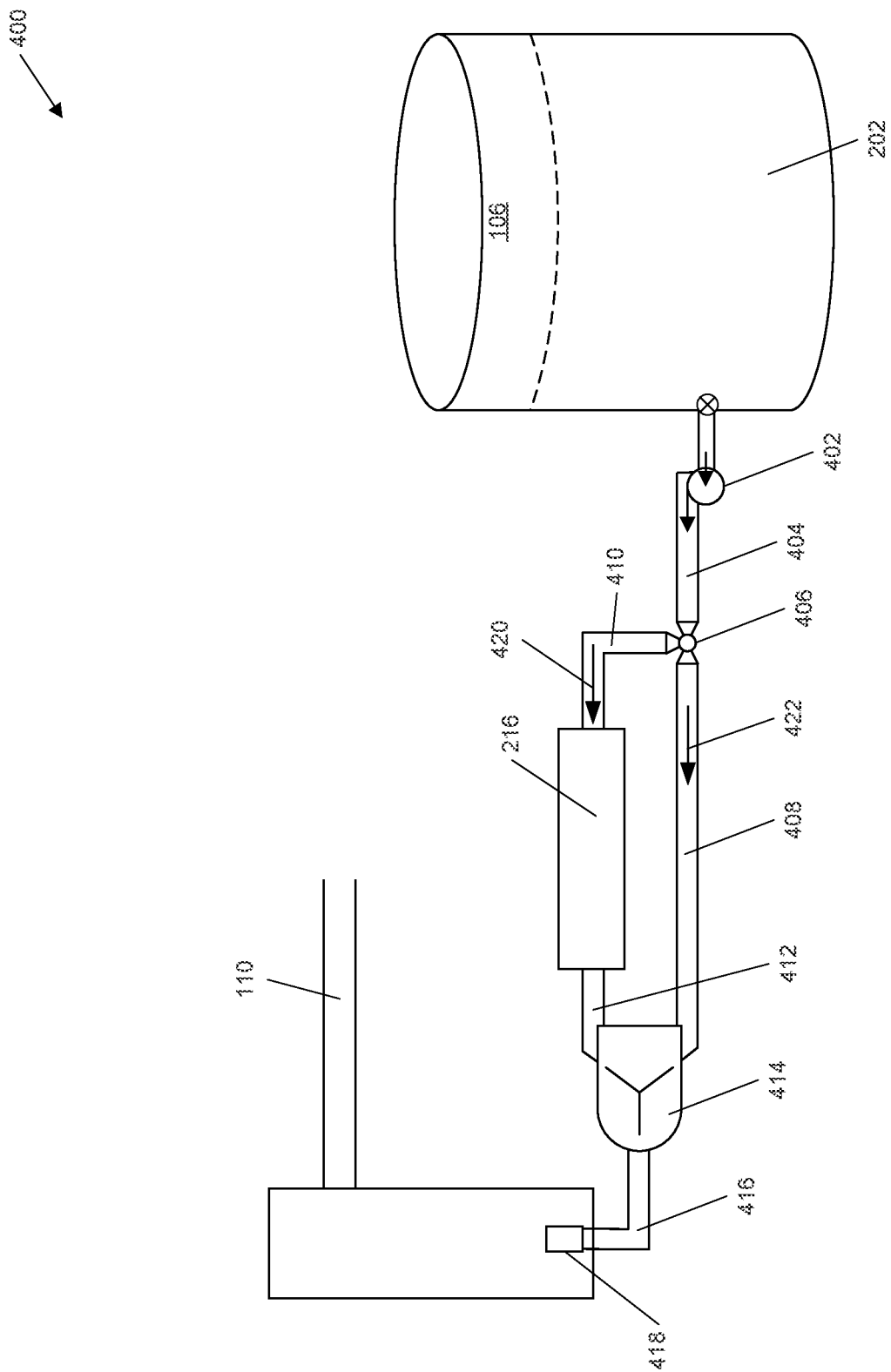
FIG. 4 is an illustration of a pilot fuel system that is configured to convert a primary fuel to a pilot fuel via a unified primary fuel line that utilizes a split valve to direct the primary fuel to a power system and a dehydration reactor.

FIG. 4 illustrates a pilot fuel system 400 that is configured to generate the pilot fuel from the primary fuel and provide the pilot fuel to the power system 100, wherein the pilot fuel system 400 includes a primary fuel pump 402 and a unified feed line 404 that provides the liquid fuel 202 to the dehydration reactor 216 (and/or the continuous reactor 116) and the plurality of cylinders 104. Additionally, the pilot fuel system 400 may include one or more support systems that are associated with the continuous reactor 116 and/or the dehydration reactor 216. For the purposes of this disclosure, the pilot fuel system 400 will be described as including the dehydration reactor 216 that receives liquid methanol from the fuel tank 106 and converts the liquid methanol into dimethyl ether via a dehydration reaction. However, it is contemplated that the pilot fuel system 400 may be configured to receive the liquid primary fuel 202 from the fuel tank 106 and convert the liquid primary fuel 202 to the pilot fuel via dehydration reaction(s), substitution reaction(s), elimination reaction(s), and/or other types of reactions that produce a pilot fuel species with a sufficiently high cetane value to initiate combustion of the liquid primary fuel 202 within the power system 100.

In some examples, the primary fuel pump 402 is configured to obtain the liquid fuel 202 from the fuel tank 106 and provide the liquid fuel 202 to a split valve 406 via the unified feed line 404. In particular, the split valve 406 fluidly connects the unified feed line 404 with a primary fuel line 408 and a reactor feed line 410. Additionally, the split valve 406 can be configured to split the liquid fuel 202 received via the unified feed line 404 to provide a first amount of the liquid fuel 202 to the dehydration reactor 216 via the reactor feed line 410 and a second amount of the liquid fuel 202 via the primary fuel line 408. Further, the unified feed line 404 and the primary fuel pump 402 may be configured to transfer the liquid fuel 202 to the primary fuel line 408 and the reactor feed line 410. For example, the primary fuel pump may be configured to provide the liquid fuel 202 at a flow rate sufficient to meet a maximum flow rate threshold for both the reactor feed line 410 and the primary fuel line 408. It should be noted that the maximum flow rate threshold is associated with a maximum amount of the liquid fuel that may be transferred via the primary fuel line 408 and the reactor feed line 410 per unit of time. Accordingly, the primary fuel pump 402 may be configured to obtain an amount of the liquid fuel 202 and provide the liquid fuel 202 via the unified feed line 404.

In some examples, the split valve 406 may be configured to provide the first amount of the liquid fuel 202 via the reactor feed line 410 and the second amount of the liquid fuel 202 via the primary fuel line 408, wherein the first amount and the second amount are determined based at least on a split ratio of the split valve 406 and a variable flowrate of the plurality of cylinders 104. In particular, the split valve 406 and the primary fuel pump 402 are configured such that the first amount of the liquid fuel 202 causes the dehydration reactor 216 to generate sufficient pilot fuel to initiate combustion of the second amount of the liquid fuel 202. Additionally, the split valve 406 and the primary fuel pump 402 may be configured such that the pilot fuel generated by the dehydration reactor 216 from the first amount and the second amount of the liquid fuel 202 outputs sufficient power via the plurality of cylinders 104 to satisfy a power demand of the power system 100. Accordingly, the primary fuel pump 402 may be configured such that the liquid fuel 202 provided via the unified feed line 404 is sufficient to generate the pilot fuel via the dehydration reactor 216 and drive the plurality of cylinders 104. Further, the split valve 406 may be configured to split the liquid fuel 202 received via the unified feed line 404 and provide the first amount to the reactor feed line 410 and the second amount to the primary fuel line 408.

In some examples, the liquid fuel 202 provided to the dehydration reactor 216 via the reactor feed line 410 may be processed in a manner discussed by at least one of FIG. 2 and/or FIG. 3. It should be noted that while FIG. 2 and FIG. 3 primarily discussed utilization of a substantially complete conversion of the liquid fuel 202 to the pilot fuel (e.g., greater than 95% of the liquid fuel 202 is converted into the pilot fuel), the dehydration reactor may be configured to achieve a conversion ratio. In particular, the dehydration reactor 216 may be configured to output the pilot fuel in proportion to the liquid fuel 202 per the conversion ratio. For example, the dehydration reactor 216 may be configured to have a 2:1 conversion ratio (e.g., mass based ratio, volume based ratio, etc.), wherein 2 parts of the pilot fuel are output for 1 part of the liquid fuel output by the dehydration reactor 216. Additionally, the conversion ratio may be controlled via the first amount of the liquid fuel 202 provided to the dehydration reactor 216, a flow rate of the first amount of the liquid fuel 202 through the dehydration reactor 216, a temperature of the dehydration reactor, and other process variables of the dehydration reactor 216. Further, the split valve 406 may be configured to modulate the first amount of the liquid fuel 202 provided to the dehydration reactor 216 and/or the fluid velocity of the first amount through the dehydration reactor 216.

In some examples, the split valve 406 may be configured to provide the second amount to a fuel mixer 414 via the primary fuel line 408. In particular, the second portion of the liquid fuel 202 is utilized as the primary fuel for the plurality of cylinders 104 and is combined with the pilot fuel generated by the dehydration reactor 216 via the fuel mixer 414. In particular, the fuel mixer 414 is configured to combine the second amount of the liquid fuel 202 with at least the pilot fuel generated by the dehydration reactor 216 and output a fuel mixture to the plurality of cylinders 104. Additionally, the fuel mixture can be provided, via a fuel input line 416, to a fuel injector 418. Accordingly, the pilot fuel system 400 can be a unified fuel system that provides a mixture of the primary fuel and the pilot fuel to the plurality of cylinders via the fuel injector 418.

In some examples, the pilot fuel system 400 may be configured to direct the liquid fuel 202, via the split valve 406 to either the fuel mixer 414 via the primary fuel line 408 or to the dehydration reactor 216. In particular, and based at least on the conversion ratio of the dehydration reactor 216, the split valve 406 can be utilized to control the flow of the primary fuel into the plurality of cylinders 104 by controlling a first flow rate, in a first direction 420, through the dehydration reactor and a second flow rate, in a second direction 422, through the primary fuel line 408. More specifically, and due to the dehydration reactor 216 being configured to drive the conversion of the liquid fuel 202 to the pilot fuel towards the conversion ratio. For example, the primary fuel line 408 and the reactor feed line 410 can be configured to have a primary fuel line diameter and a reactor feed line diameter, respectively. Additionally, the fluid velocity of the liquid fuel 202 through the dehydration reactor 216 may have an inverse relationship with the conversion ratio, wherein higher fluid velocity through the dehydration reactor 216 reduces the pilot fuel generated from the liquid fuel 202. However, the first flow rate may contain a greater amount of the pilot fuel, despite a reduced conversion ratio, at high fluid velocities due to the favorability of the liquid fuel 202 to pilot fuel reaction (e.g., due to the lower concentration the reaction that converts the liquid fuel 202 to the pilot fuel may be more favorable). Accordingly, while the conversion ratio and the concentration of the pilot fuel may be reduced for the first flow rate at higher fluid velocities, the amount of pilot fuel produced may be increased relative to lower fluid velocities. Further, and as will be discussed in greater detail below, the split valve 406 may be operated to split the liquid fuel 202 received via the unified feed line 404 and direct the liquid fuel 202, at the first flow rate in the first direction 420 and at the second flow rate in the second direction 422, to the dehydration reactor 216 and/or the fuel mixer 414.

In some examples, the fuel mixer 414 may comprise one or more external walls and one or more fluid channels that are configured to receive the pilot fuel, residual primary fuel, and byproducts from the dehydration reactor 216 and receive the liquid fuel 202 from the split valve 406. In particular, the fuel mixer 414 may be configured as a passive mixer or an active mixer that combines the liquid fuel 202, the pilot fuel, and the residual primary fuel and provides the fuel mixture to the plurality of cylinders 104. For example, the fuel mixer 414 may be a passive mixer that includes a first input channel that receives the pilot fuel and the residual fuel from the dehydration reactor and a second input channel that receives the liquid fuel 202 from the split valve 406. Additionally, the first input channel and the second input channel may be configured such that the pilot fuel, the residual primary fuel, and the liquid fuel 202 are directed into and combined within an internal chamber of the fuel mixer 414 (e.g., turbulent flow of the various fluids results in a single phase solution that may be provided to the plurality of cylinders 104). Alternatively, the fuel mixer 414 may be an active mixer that includes internal components for combining the pilot fuel, the residual primary fuel, and the liquid fuel 202 within the internal chamber. The internal components may include a motor, a drive shaft, and a blade that agitates and combines the pilot fuel, the residual primary fuel, and the liquid fuel 202 (e.g., the pilot fuel and the liquid fuel 202 may not be fully miscible and are agitated to form emulsion/suspension and ensure even dispersion of the pilot fuel within the fuel mixture). Accordingly, and independent of whether the fuel mixer 414 is an active mixer or a passive mixer, the fuel mixer 414 may receive the pilot fuel and the liquid fuel 202 via the reactor output line 412 and the primary fuel line 408. Further, the fuel mixer 414 may provide the fuel mixture of the pilot fuel and the liquid fuel 202 via a fuel input line 416 of the plurality of cylinders 104.

Figure 5:
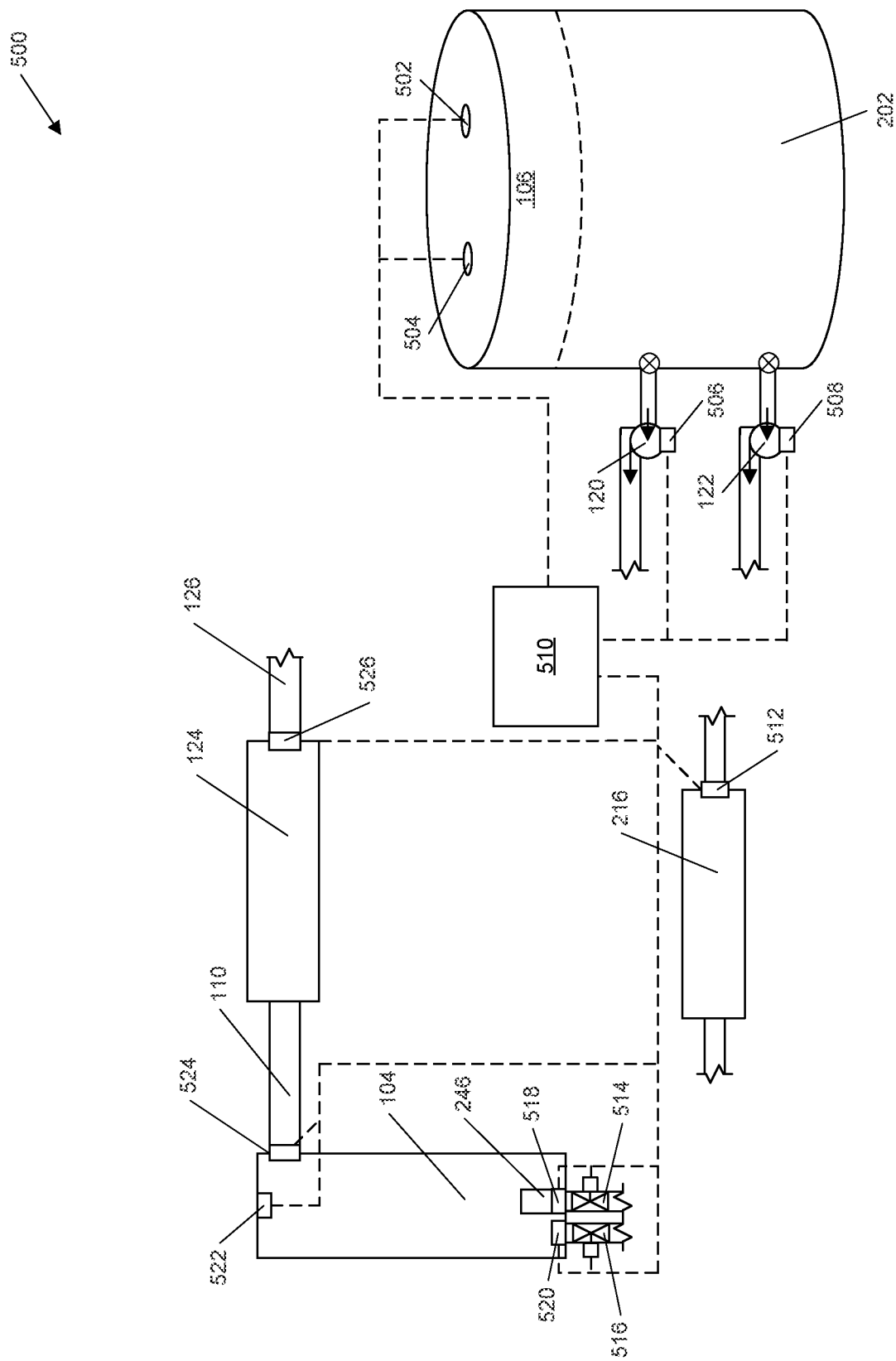
FIG. 5 is an illustration of a control system that enables a controller to monitor and modify operating variables for a pilot fuel system and a primary fuel system.

FIG. 5 is a block diagram of a control system 500 that is configured to operate a pilot fuel system (e.g., the pilot fuel system 200, the pilot fuel system 300, etc.) and support operation of the power system 100. In particular, the control system 500 may be configured to ensure that sufficient pilot fuel is produced to initiate combustion within the power system 100 and that sufficient primary fuel is provided to drive the power system 100. Additionally, the control system 500 may be configured to monitor the power system 100 and the pilot fuel system to maintain operation of the power system 100 and prevent damage to internal components of associated systems. Accordingly, the control system 500 may include a plurality of sensors associated with individual components of the associated systems that track process variables and an electronic controller that modifies operation of the associated systems in view of the process variables.

In some examples, the control system 500 may include a tank temperature sensor 502, a tank pressure sensor 504, a first flow rate sensor 506, and a second flow rate sensor 508 that are associated with the fuel tank 106, the pilot fuel pump 120, and/or the primary fuel pump 122. In particular, the tank temperature sensor 502 and the tank pressure sensor 504 may be configured to determine and transmit indications of a storage temperature and a storage pressure of the liquid fuel 202 within the fuel tank 106 to a controller 510 associated with the fuel tank 106. More specifically, the tank temperature sensor 502, the first flow rate sensor 506, and the second flow rate sensor 508 may be utilized, by the controller 510, to monitor the liquid fuel 202 that enters the pilot fuel system and modulate operation of the pilot fuel pump 120 and the primary fuel pump 122. For example, the first flow rate sensor 506 may determine and provide an indication of the first flow rate 218 that is provided to the heat exchanger 204 and ultimately the dehydration reactor 216. Further, the storage temperature determined by the tank temperature sensor 502 may be associated with an input temperature of the heat exchanger 204. Additionally, a reactor temperature sensor 512 may be configured to determine and transmit indications of a reactor temperature associated with the dehydration reactor 216 and/or the liquid fuel 202 provided to the dehydration reactor 216. Based at least on the storage temperature and the reactor temperature, the controller 510 can determine a temperature delta (e.g., a difference between the storage temperature and the reactor temperature) of the liquid fuel 202 caused by the heat exchanger. Additionally, the controller 510 can determine whether additional heating is to be provided to the liquid fuel 202. For example, the controller 510 can cause an increase or a decrease in thermal energy generated by an in-line fluid heater, an increase flow rate of a working fluid through the heat exchanger 204, an increased working fluid temperature, and/or other thermal energy providing device to further increase the temperature delta for the liquid fuel 202. It should be noted that, depending on the configuration of the dehydration reactor, the liquid fuel 202 may be evaporated and passed through the dehydration reactor as a vapor (e.g., the reactor temperature sensor 512 confirms that the fluid temperature of the liquid fuel 202 exceeds a vaporization temperature of the primary fuel). Alternatively, or in addition, the liquid fuel may exceed a temperature threshold associated with the one or more catalyst structures 234 that enables the conversion of the liquid fuel 202 to the pilot fuel (e.g., the dehydration reaction for converting the primary fuel to the pilot fuel is substantially complete for fluid temperatures exceeding the temperature threshold for a flow rate of the liquid fuel 202). Accordingly, the controller 510 can be configured to receive and monitor indications from the tank temperature sensor 502, the tank pressure sensor 504, the first flow rate sensor 506, the second flow rate sensor 508, and the reactor temperature sensor 512.

In some examples, the first flow rate sensor 506 and the reactor temperature sensor 512 may determine the first flow rate 218 and a reactor temperature that are transmitted to the controller 510, wherein the controller 510 monitors the conversion of the liquid fuel 202 to the pilot fuel via the first flow rate 218 and the reactor temperature. In particular, the operating window of the dehydration reactor 216 may be related to the first flow rate 218 of the liquid fuel 202 through the dehydration reactor 216, the reactor temperature, the reactor pressure, and/or other process variables. It should be noted that in many configurations, the dehydration reactor 216 may operate as a substantially isobaric environment. Accordingly, fluctuations in the first flow rate 218 and the reactor temperature may be correlated with the conversion ratio for the dehydration reactor 216, wherein the controller 510 may be configured to maintain the conversion ratio above a conversion threshold (e.g., maintain substantially complete conversion). Further, the controller 510 may be configured to modify operation of the heat exchanger 204, reactor heating elements (e.g., internal and/or external structures that may provide additional thermal energy via resistive, conductive, inductive, etc. heating elements), and/or fluid heaters to maintain the conversion ratio above the conversion threshold in response to variations in the first flow rate 218.

In some examples, the control system 500 may include a pilot fuel valve 514 and a primary fuel valve 516 that control injection of the pilot fuel and the primary fuel into the cylinder 104. Additionally, a pilot fuel temperature sensor 518 and a primary fuel temperature sensor 520 may determine and transmit one or more indications of a first fluid temperature for the pilot fuel and a second fluid temperature for the primary fuel for the controller 510. Further, a cylinder pressure sensor 522 and an exhaust temperature sensor 526 may be configured to determine and transmit indications of a cylinder pressure and a cylinder temperature to the controller 510. More specifically, the exhaust temperature sensor 526 may be configured to determine an exhaust temperature that is correlated to the cylinder temperature. Alternatively, the cylinder temperature can be determined by the cylinder temperature sensor 524. Accordingly, the controller 510 may receive the indications generated by the control system 500 for the plurality of cylinders and modify cylinder operations, primary fuel to pilot fuel ratios, and support system operation to maintain power output by the power system 100.

In some additional examples, the pilot fuel valve 514 and the primary fuel valve 516 may be operable by the controller 510 to control injection timing and ignition cycles for the plurality of cylinders. Additionally, the pilot fuel valve 514 and the primary fuel valve 516 may be configured as valves that are configured to fluidly connect and fluidly disconnect feed lines for the primary fuel and the pilot fuel with the plurality of cylinders 104 (e.g., the pilot fuel valve 514 permits and prevents the pilot fuel from being provided to the pilot fuel injector 246) via mechanical, pneumatic, hydraulic and/or otherwise controlled components. Alternatively, the pilot fuel valve 514 and/or the primary fuel valve may be configured to direct the primary fuel and/or the pilot fuel into the plurality of cylinders based at least on an injection timing that aligns with specific points (e.g., a compression stroke of a piston within the cylinder) in an operation cycle of the plurality of cylinders 104 (e.g., mechanical injectors, hydraulic injectors, pneumatic injectors, common rail injectors, etc.). In particular, and independent of the cycle structure of the plurality of cylinders 104, the controller 510 may be configured to modify the injection timing of the pilot fuel and the primary fuel to control a combustion environment within the plurality of cylinders 104. More specifically, the controller 510 may advance injection of the pilot fuel via the pilot fuel valve 514 to cause a more efficient combustion reaction (e.g., better conversion of heat to work due to the primary fuel burning faster and hotter) of the primary fuel that produces increased pollutants or delay injection of the pilot fuel to cause a less efficient combustion of the primary fuel that reduces the pollutants generated by the plurality cylinders 104. Additionally, the controller 510 may similarly operate the primary fuel valve 516 to modify an injection timing of the primary fuel to balance power generation (e.g., more efficient combustion yields better heat to work conversion) and pollutant generation (e.g., hotter combustion yields more pollutant species). Further, the controller 510 may advance or delay injection timings to ensure complete combustion of the primary fuel (e.g., may advance injection timing for the pilot fuel and/or the primary fuel to ensure that the primary fuel is substantially consumed by the combustion reaction).

In some examples, the controller 510 may determine whether a fuel cooler and/or a fuel heater is to be activated to control the pilot fuel temperature and the primary fuel temperature based at least on indications received from and determined by the pilot fuel temperature sensor 518 and the primary fuel temperature sensor 520. In particular, the primary fuel and the pilot fuel may be injected into the plurality of cylinders 104 at an input temperature that may be substantially equivalent to ambient temperature or that may utilize a combination of fluid heaters and fluid coolers to modulate the temperature of the primary fuel and/or the pilot fuel. For example, a fluid cooler may permit an increased density of the primary fuel and/or the pilot fuel that permits increased power output by the power system 100. Alternatively, a fluid heater may ensure effective operation of the power system 100 in low temperature environments (e.g., diesel may fail to ignite at temperatures below a threshold, temperature may impact cetane number of the pilot fuel, etc.). Accordingly, the controller 510 may be configured to activate and/or deactivate temperature regulating systems for the pilot fuel, the primary fuel, oxidation species that enable combustion (e.g., oxygen in air is consumed during the combustion of the primary fuel and the pilot fuel), and other reactive species within the plurality of cylinders 104.

In some examples, the controller 510 may monitor a cylinder pressure and a cylinder temperature via indications transmitted by the cylinder pressure sensor 522 and the exhaust temperature sensor 526. In particular, the cylinder pressure sensor 522 can be configured to determine and transmit the indications of the cylinder pressure during operation of the power system 100. Similarly, the cylinder temperature sensor 524 can be configured to determine and transmit the indications of the cylinder temperature based at least on the exhaust that is output by the plurality of cylinders after combustion of the primary fuel. Additionally, the cylinder pressure and the cylinder temperature may be indicative of the completeness of the combustion reaction (e.g., whether the primary fuel was fully consumed and converted to heat and ultimately power output). Further, the completeness of the combustion reaction and process variables of the combustion reaction (e.g., combustion temperature, combustion pressure, pollutant output, etc.) may be determined based at least on the indications generated by the cylinder pressure sensor 522 and the cylinder temperature sensor 524. Similarly, an SCR system sensor may be configured to measure pollutant concentration within the exhaust output by the power system 100. The pollutant concentration may be a determining variable in the operation of the power system 100 due to pollutant regulations that dictate appropriate output of pollutants during operation of the power system 100.

Figure 6:
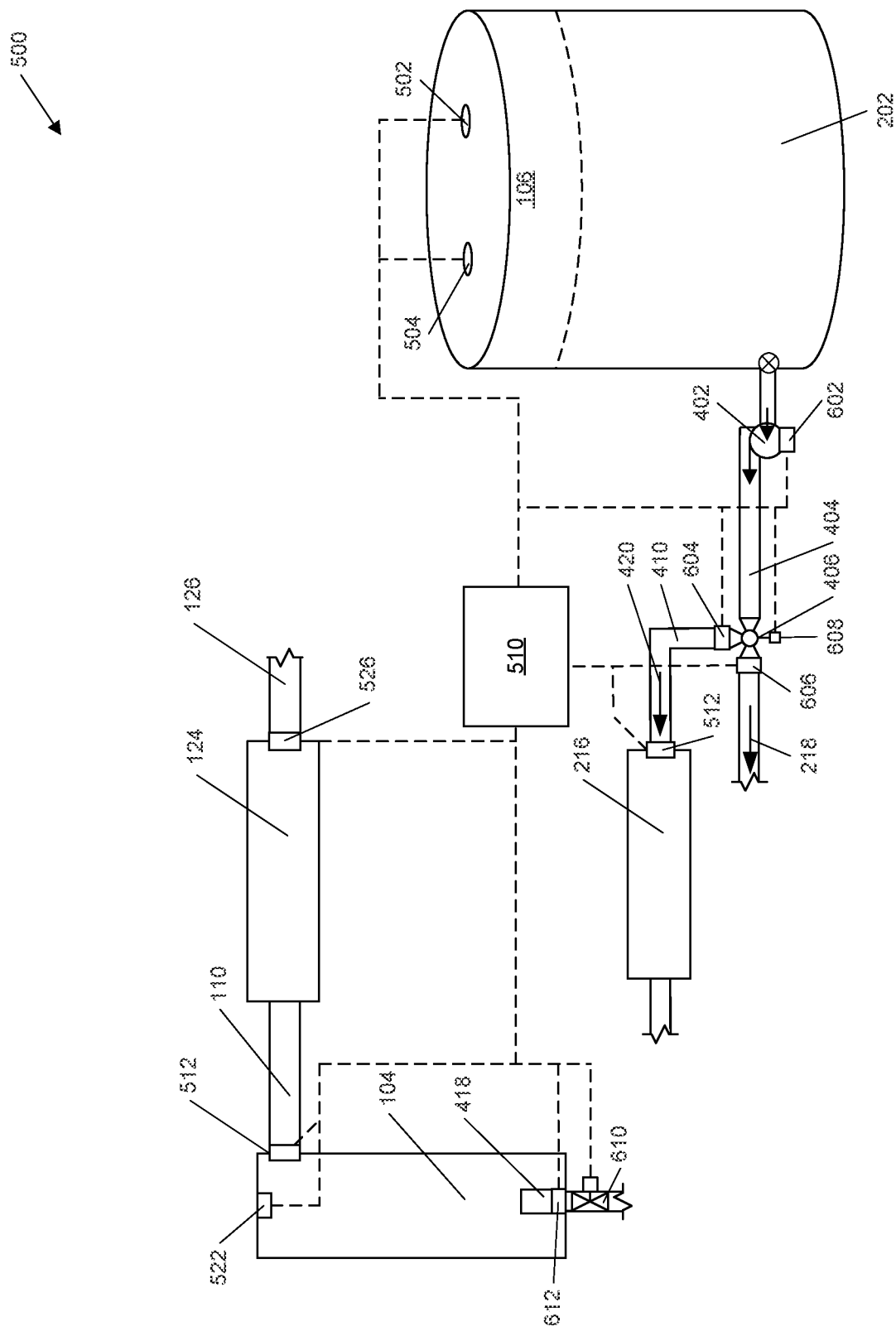
FIG. 6 is an illustration of a control system that enables a controller to monitor and modify operating variables for a unified fuel system.

FIG. 6 is a block diagram of a control system 600 that is configured to operate a pilot fuel system (e.g., the pilot fuel system 400) and support operation of the power system 100. In particular, the control system 600 may be configured to ensure that sufficient pilot fuel is produced to initiate combustion within the power system 100 and that sufficient primary fuel is provided to drive the power system 100. Additionally, the control system 600 may be configured to monitor the power system 100 and the pilot fuel system to maintain operation of the power system 100 and prevent damage to internal components of associated systems. Accordingly, the control system 500 may include a plurality of sensors associated with individual components of the associated systems that track process variables and an electronic controller that modifies operation of the associated systems in view of the process variables.

In some examples, the control system 600 may include components that are similarly configured to components of the control system 500. In particular, the control system 600 may include the tank temperature sensor 502 and the tank pressure sensor 504 for monitoring the storage temperature and the storage pressure of the liquid fuel 202 as described above by the discussion of FIG. 5. Additionally, the reactor temperature sensor 512 may be configured to determine and transmit indications of the reactor temperature associated with the dehydration reactor 216 and/or the liquid fuel 202 provided to the dehydration reactor 216. Further, the plurality of cylinders 104 and operation of the power system 100 may be at least partially monitored via the cylinder pressure sensor 522, the cylinder temperature sensor 524, and the SCR system sensor 526. Accordingly, the controller 510 can be configured to receive and monitor indications from the various sensors in a manner similar to that described with reference to FIG. 5.

In some examples, the control system 600 may include a unified flow rate sensor 602 that is associated with the primary fuel pump 402 and the unified feed line 404. Additionally, the control system 600 may include a reactor flow rate sensor 604 and a bypass flow rate sensor 606 that are associated with the reactor feed line 410 and the primary fuel line 408, respectively. Further, the control system 600 may include a split valve controller 608 that is configured to modify the first flow rate and the second flow rate through the reactor feed line 410 and the primary fuel line 408. In particular, the controller 510 may be configured to receive indications from the unified flow rate sensor of a total flow rate, obtained by the primary fuel pump 402, that is transferred to the pilot fuel system. Additionally, the controller 510 may be configured to determine, based at least on the pilot fuel to be generated for the power system 100, the first flow rate that is to be provided to the dehydration reactor and the second flow rate that is to be provided directly to the fuel mixer 414 and/or the plurality of cylinders 104 (e.g., depending on whether the pilot fuel and the primary fuel are mixed before injection). Further, the controller 510 may determine, based at least on the process variables of the dehydration reactor 216 and the conversion ratio of the dehydration reactor, an amount of pilot fuel generated per unit of time and an effective flow rate of the pilot fuel/the residual primary fuel from the dehydration reactor 216. Accordingly, the controller 510 may monitor the first flow rate and the second flow rate via the reactor flow rate sensor 604 and the bypass flow rate sensor 606 to ensure sufficient generation of the pilot fuel to initiate combustion of the remnant primary fuel from the reactor feed line 410 and the primary fuel of traversing the primary fuel line 408.

In some examples, the control system 600 may utilize a fuel valve 610 and a fuel temperature sensor 612 may be utilized to monitor the fuel mixture that is injected into the plurality of cylinders 104 and to control injection timing and ignition cycles for the plurality of cylinders 104. Similar to the pilot fuel valve 514 and the primary fuel valve 516, the fuel valve 610 may be configured as a valve that fluidly connects and fluidly disconnects the fuel input line 416 with the fuel injector 418 associated with the plurality of cylinders 104 (e.g., the fuel valve 610 permits and prevents the fuel mixture from being provided to the fuel injector 418) via mechanical, pneumatic, hydraulic and/or otherwise controlled components. In particular, and independent of the cycle structure of the plurality of cylinders 104, the controller 510 may be configured to modify the injection timing of the fuel mixture created by the fuel mixer 414 to control a combustion environment within the plurality of cylinders 104. More specifically, the controller 510 may advance injection of the fuel mixture via the fuel valve 610 to cause a more efficient combustion reaction (e.g., better conversion of heat to work due to primary fuel burning faster and hotter) of the fuel mixture, producing increased amounts of pollutants, or delay injection of the fuel mixture to cause a less efficient combustion of the primary fuel that reduces the pollutants generated by the plurality cylinders 104. Further, the controller 510 may advance or retard injection timings to ensure complete combustion of the fuel mixtures (e.g., may advance injection timing for fuel mixture to ensure that the primary fuel is substantially consumed by the combustion reaction).

Figure 7:
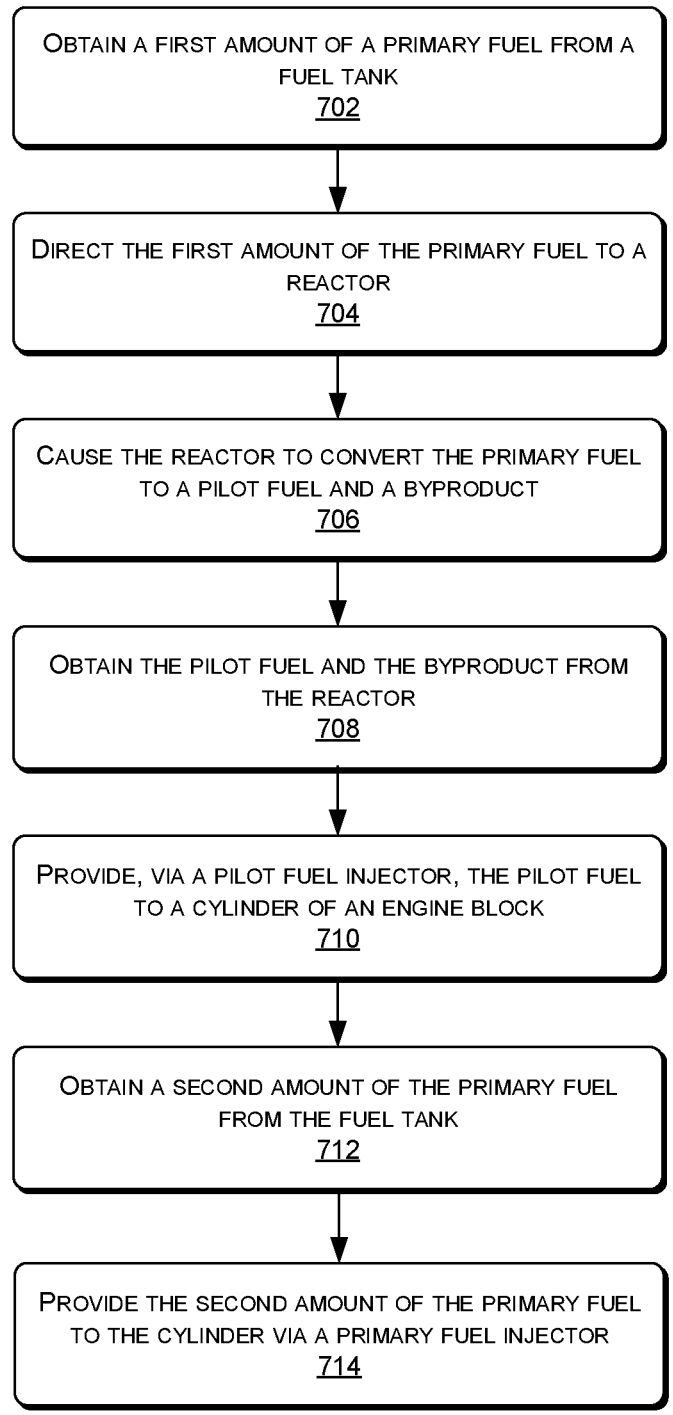
FIG. 7 is a block diagram illustrating a method for operating a power system that receives a pilot fuel and a primary fuel according to examples of the present disclosure.

FIG. 7 is a block diagram of a method 700 according to examples of the present disclosure. The method 700 can be executed by a processor of the controller 510 to operate various components of the control system 500 and the control system 600. Additionally, any of the methods described herein may be performed in whole, or in part, by the one or more processors associated with the controller 510 and/or other control devices associated with the power system 100.

At 702, the processor can activate the pilot fuel pump 120 and/or the primary fuel pump 402 such that a first amount of the pilot fuel is obtained from the fuel tank 106. In particular, the processor may cause power to be provided and drive the pilot fuel pump 120 and/or the primary fuel pump 402. Additionally, the first amount of the primary fuel may be determined based at least on a pilot fuel consumption rate of the plurality of cylinders 104. More specifically, the first amount of primary fuel obtained from the fuel tank 106 may be sufficient to produce the pilot fuel consumed by the combustion reaction within the plurality of cylinders 104 at the pilot fuel consumption rate for the operating state of the power system 100. Further, the first amount of the primary fuel from the fuel tank 106 may be determined based at least on a conversion ratio of the dehydration reactor 216. For example, the dehydration reactor 216 may be configured to drive conversion of the first amount of primary fuel towards substantial completion, wherein substantially all (e.g., greater than 95% of the primary fuel) of the primary fuel is converted into the pilot fuel. Accordingly, the first amount of the primary fuel that is provided to the dehydration reactor 216 may be substantially equivalent to the amount of pilot fuel consumed by the power system 100. Alternatively, or in addition, the dehydration reactor 216 may be configured such that the pilot fuel is provided in proportion to the primary fuel based at least on a fuel ratio. For example, the pilot fuel may be provided to the power system 100 such that the pilot fuel entering the power system 100 is provided at a pilot fuel flow rate that is 20% of the primary fuel flow rate, the fuel ratio being five units of primary fuel to one unit of pilot fuel ratio. Accordingly, the first amount of the primary fuel can be determined based at least on the amount of pilot fuel that is to be provided to the plurality of cylinders 104, in ratio with the primary fuel consumed by the combustion reaction within the plurality of cylinders 104.

At 704, the processor can cause the first amount of the primary fuel to be directed to the dehydration reactor 216 (or the continuous reactor 116). In some examples, the pilot fuel pump 120 may be configured to obtain the first amount of the primary fuel and output the first amount of the primary fuel to the dehydration reactor 216 via a reactor feed line 118. In some additional examples, the primary fuel pump 402 may be configured to obtain at least the first amount of the primary fuel and output the first amount of the primary fuel to the split valve 406. Additionally, the split valve 406 may be configured to direct the first amount of the primary fuel received from the primary fuel pump 402 to the dehydration reactor 216 via the reactor feed line 410. Further, an internal valve of the split valve 406 may be operable to modulate the first amount of the primary fuel that is provided to the dehydration reactor. For example, the internal valve of the split valve 406 may be controlled via pneumatics, hydraulics, motors, actuators, and/or other components controlled by the processor to increase and/or decrease the first amount of the primary fuel provided to the dehydration reactor 216.

At 706, the processor can cause the dehydration reactor 216 to convert the first amount of the primary fuel to the pilot fuel and a byproduct. In particular, providing the first amount of the primary fuel to the dehydration reactor 216 via the pilot fuel pump 120 and/or the primary fuel pump 402 via the split valve 406 may pass the first amount of the primary fuel through and/or past a catalyst structure that catalyzes a dehydration reaction converting the primary fuel to the pilot fuel. It should be noted that the processor may similarly cause the continuous reactor 116 and/or other reactors to receive and convert the primary fuel to the pilot fuel via a catalyzed reaction that selects for and/or prioritizes the conversion of the primary fuel to the pilot fuel. Additionally, the dehydration reaction may produce the byproduct during the conversion from the primary fuel to the pilot fuel. Further, the dehydration reactor 216 and the catalyst structure may be configured to select for and/or prioritize the dehydration reaction converting the primary fuel to the pilot fuel while downregulating side reactions and/or reverse reactions. Side reactions are additional reactions that may occur within a reactor environment (e.g., based on the reactor temperature, the reactor pressure, active sites of the catalyst structure, etc.) that form additional chemical species other than the primary fuel and the pilot fuel. Reverse reactions are chemical reactions that convert the pilot fuel back into the primary fuel such that the primary fuel and the pilot fuel exist in equilibrium.

Additionally, the processor can cause the dehydration reactor 216 to convert the first amount of the primary fuel to the pilot fuel and a byproduct via control of an input temperature and a flow rate of the primary fuel. In particular, the input temperature and the flow rate of the primary fuel may be utilized to drive conversion of the primary fuel to the pilot towards completion and/or to achieve a conversion ratio for the primary fuel (e.g., approximately 20% of the primary fuel is to be converted into the pilot fuel by the dehydration reactor 216). The processor may be configured to modify operation of the pilot fuel pump 120 (e.g., increase and decrease the flow rate of the primary fuel into and through the dehydration reactor 216), the heat exchanger 204 (e.g., increase and decrease the input temperature of the primary fuel), and other components of the pilot fuel system to control conversion of the primary fuel to the pilot fuel. Additionally, the process may be configured to control additional systems such as heating systems, cooling systems, throttling valves, pumps, and other support systems that modify the input temperature and the flow rate of the primary fuel. It should be noted that the flow rate may be correlated to an input pressure of the primary fuel applied by the pilot fuel pump. Accordingly, by modifying the input temperature and the flow rate of the primary fuel into the dehydration reactor 216, the processor can modify the conversion ratio of the primary fuel to the pilot fuel. Modifying the input temperature may be utilized to increase or decrease the conversion ratio of the primary fuel to pilot fuel (e.g., increased input temperature increases conversion for reactions with a positive relationship with the input temperature). Similarly, modifying the flow rate may be utilized to increase or decrease contact time between active sites within the catalyst structure and increase or decrease the conversion ratio.

At block 708, the processor may cause the pilot fuel and the byproduct(s) to be obtained from the dehydration reactor 216. In particular, the pilot fuel and the byproduct(s) may be output by the dehydration reactor 216 due to the flow rate caused by the pilot fuel pump 120 and/or the primary fuel pump 402. Alternatively, or in addition, an output pump may be associated with the dehydration reactor 216 and may be operated to obtain the pilot fuel and the byproduct(s) and provide the pilot fuel and the byproduct(s) to the dehydration reactor 216.

Additionally, the processor may be configured to manage a fill level of the buffer tank 302. In particular, the pilot fuel and the byproduct may be output by the dehydration tank 216 to the buffer tank 302. Additionally, the processor may be configured to operate the buffer tank pump 308 to obtain the pilot fuel and the byproduct at the variable flow rate that is provided to the power system 100. As noted above, the pilot fuel within the buffer tank 302 may be utilized to satisfy increases and decreases in the pilot fuel consumed by the power system 100, decoupling operation of the dehydration reactor 216 from the power system 100. For example, the buffer tank 302 may be associated with a first threshold that is associated with a minimum fill level and a second threshold associated with a maximum fill level. The first threshold may be configured such that the dehydration reactor 216 may be operated to produce increased amounts of the pilot fuel and substantially prevent the buffer tank 302 from being fully drained. Similarly, the second threshold may be configured such that the dehydration reactor 216 may be operated to produce decreased amounts of the pilot fuel and substantially prevent the buffer tank 302 from being filled, causing the dehydration reactor 216 and the pilot fuel system to hold a mixture of the pilot fuel, the primary fuel, and the byproduct(s). Accordingly, the processor may receive one or more signals of the fill level of the buffer tank 302 and determine, based at least on the first threshold and the second threshold, whether the amount of pilot fuel produced by the dehydration reactor 216 is to be modified. Further, the processor may determine that the amount of pilot fuel produced is to be increased or decreased and cause corresponding changes to the flow rate of the primary fuel to the dehydration reactor, the temperature of the reactor, and/or other controls associated with the production of the pilot fuel.

At 710, the processor may cause the pilot fuel injector 246 to provide the pilot fuel to a cylinder of the power system 100. In particular, the pilot fuel injector may be configured to provide the pilot fuel to the cylinder based at least on an injection timing that is determined by the processor. More specifically, the injection timing determines a first time, during cyclical operation of the piston and/or other components within the cylinder, that the pilot fuel is to be injected into the cylinder. Advancing the injection timing (e.g., providing the pilot fuel to the cylinder earlier within a cycle of the power system 100), may result in a hotter combustion reaction that produces power more efficiently than a delayed injection timing. Additionally, delaying the injection timing (e.g., providing the pilot fuel to the cylinder later within the cycle of the power system 100) may result in a cooler combustion reaction that produces less pollutant species than an advanced injection timing. Accordingly, the processor may be configured to control a pneumatic, hydraulic, mechanical, or other system within the pilot fuel injector 246 to advance or delay providing the pilot fuel to the cylinder.

At 712, the processor may cause a second amount of the primary fuel to be obtained from the fuel tank 106 via the primary fuel pump 122 or the primary fuel pump 402. In particular, the processor may cause power to be provided and drive the primary fuel pump 122 and/or the primary fuel pump 402 to obtain the second amount of the primary fuel from the fuel tank 106. Additionally, the second amount of the primary fuel may be determined based at least on a primary fuel consumption rate of the plurality of cylinders 104. More specifically, the second amount of primary fuel obtained from the fuel tank 106 may be sufficient to, when consumed by a combustion reaction within the plurality of cylinders 104, satisfy a power demand associated with the power system 100.

At 714, the processor may cause the second amount of the primary fuel to be provided to the cylinder via a primary fuel injector. Similar to the pilot fuel injector 246, the primary fuel may be injected based at least on a primary fuel injection timing that may be advanced and/or retarded to modify the combustion reaction within the cylinder. Additionally, where the pilot fuel injector and the primary fuel injector are a unified fuel injector (e.g., the pilot fuel and the primary fuel are mixed prior to being provided to the cylinder), the injection timing for the pilot fuel and the primary fuel may be at the same time during the cyclical operation of the power system 100. Alternatively, the primary fuel may be injected at a first time based at least on the injection timing of the pilot fuel injector 246 and the primary fuel may be injected at a second time after the first time. Accordingly, the pilot fuel may be provided to the cylinder prior to the primary fuel to initiate a combustion reaction and the primary fuel may be provided to the cylinder after the pilot fuel to be consumed by the combustion reaction.

Figure 8:
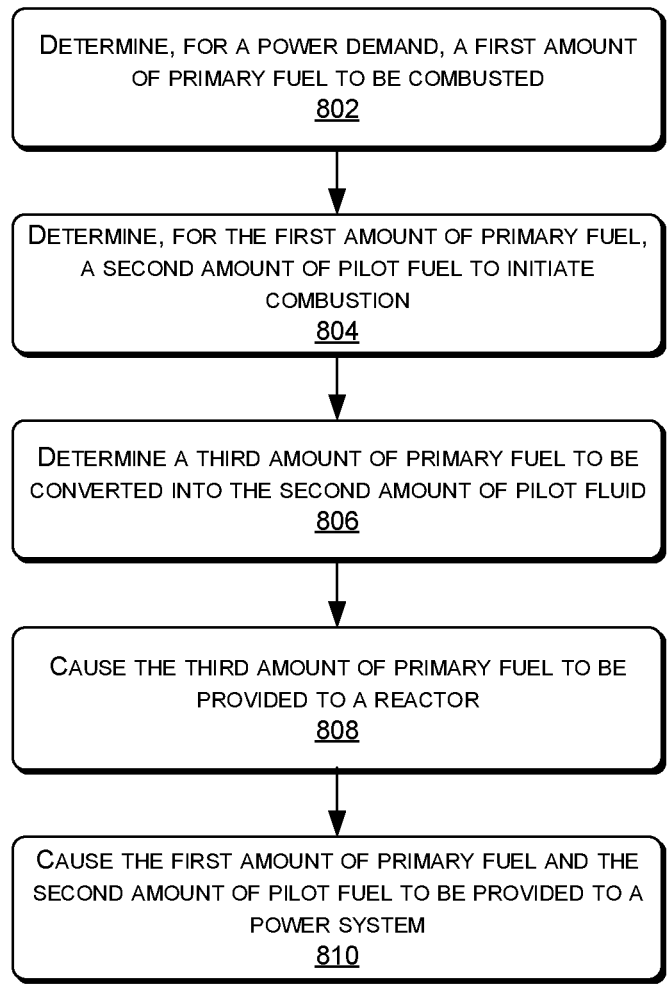
FIG. 8 is a block diagram illustrating a method for determining and generating an amount of a pilot fuel for initiating combustion of a primary fuel for power generation according to examples of the present disclosure.

FIG. 8 is a block diagram of a method 800 according to examples of the present disclosure. The method 800 can be executed by a processor of the controller 510 to operate various components of the control system 500 and the control system 600. Additionally, any of the methods described herein may be performed in whole, or in part, by the one or more processors associated with the controller 510 and/or other control devices associated with the power system 100.

At 802, the processor can be configured to determine a first amount of the primary fuel to be combusted by the power system 100. In particular, a power demand associated with the power system 100 can be utilized to determine a consumption rate of the primary fuel such that the first amount of the primary fuel is obtained from the fuel tank and provided to the power system at a first flow rate. Additionally, the first amount of the primary fuel can be determined based at least on the primary fuel injection timing. For example, for an advanced injection timing, a decreased amount of the primary fuel may be provided due to the more efficient conversion of heat to power enabled by the hotter combustion reaction. Similarly, for a retarded injection timing, an increased amount of the primary fuel may be provided due to the less efficient conversion of heat to power caused by the cooler combustion reaction. It should be noted that, due to the combustion reaction taking an amount of time to consume the first amount of the primary fuel, the advanced injection timing provides additional time for the primary fuel to be consumed yielding a more complete and "hotter" (e.g., due to the consumption of the primary fuel) combustion reaction. Accordingly, the processor may be configured to determine the first amount of the primary fuel based at least on the consumption rate of the primary fuel for a configuration of the injection timing.

At 804, the processor can be configured to determine a second amount of the pilot fuel to be provided to the power system 100. In particular, the second amount of the pilot fuel can be determined based at least on the first amount of the primary fuel that will be consumed by the combustion reaction. More specifically, the second amount of the pilot fuel is determined such that the combustion reaction can be initiated within the cylinder and consume the primary fuel. For example, the primary fuel may be unable to auto-ignite in a compression ignition power system. Additionally, the pilot fuel may be selected to auto-ignite within the power system 100 when compressed within the cylinder (e.g., by a piston within the cylinder). Further, the injection timing of the first amount of the primary fuel and the second amount of the pilot fuel may be configured such that the pilot fuel is provided to the cylinder, ignited via compression, and initiates the combustion reaction that consumes the primary fuel, ultimately generating power via the power system 100. Accordingly, the second amount of the pilot fuel is determined to introduce sufficient thermal energy to substantially consume the first amount of the primary fuel.

At 806, the processor can be configured to determine a third amount of the primary fuel to be converted into the second amount of the pilot fuel. As noted above, the third amount of the primary fuel can be determined based at least on the second amount of the pilot fuel that is generated by the dehydration reactor 216. Additionally, and based at least on the conversion ratio, the third amount of the primary fuel may not fully convert into the second amount of the pilot fuel. In particular, the dehydration reactor 216 may be configured to convert a portion of the third amount of the primary fuel to generate the second amount of the pilot fuel. Additionally, the dehydration reactor 216 may output a second portion of the third amount, the second amount, and a byproduct to the power system 100 in a solution (e.g., the pilot fuel, the primary fuel, and/or the byproduct are fully miscible and form a single phase solution). Accordingly, the third amount of the primary fuel may be determined such that providing the first amount of the primary fuel and the second portion of the third amount of the primary fuel supplies sufficient primary fuel to the power system 100 to satisfy the power demand.

At 808, the processor can cause the third amount of the primary fuel to be provided to the dehydration reactor 216. Additionally, at 810, the processor can cause the first amount of the primary fuel and the second amount of the pilot fuel to be provided to the power system 100. As discussed above, the processor can be configured to control the buffer tank pump 308, the fuel mixer 414, and other components (e.g., the pilot fuel pump 120, the primary fuel pump 122, the primary fuel pump 402, etc.) to direct the pilot fuel and the primary fuel to the cylinder. Further, the processor can cause the primary fuel injector, the pilot fuel injector 246, and/or the fuel injector 418 to provide the primary fuel, the pilot fuel, and/or the mixed fuel to the cylinder.

Figure 9:
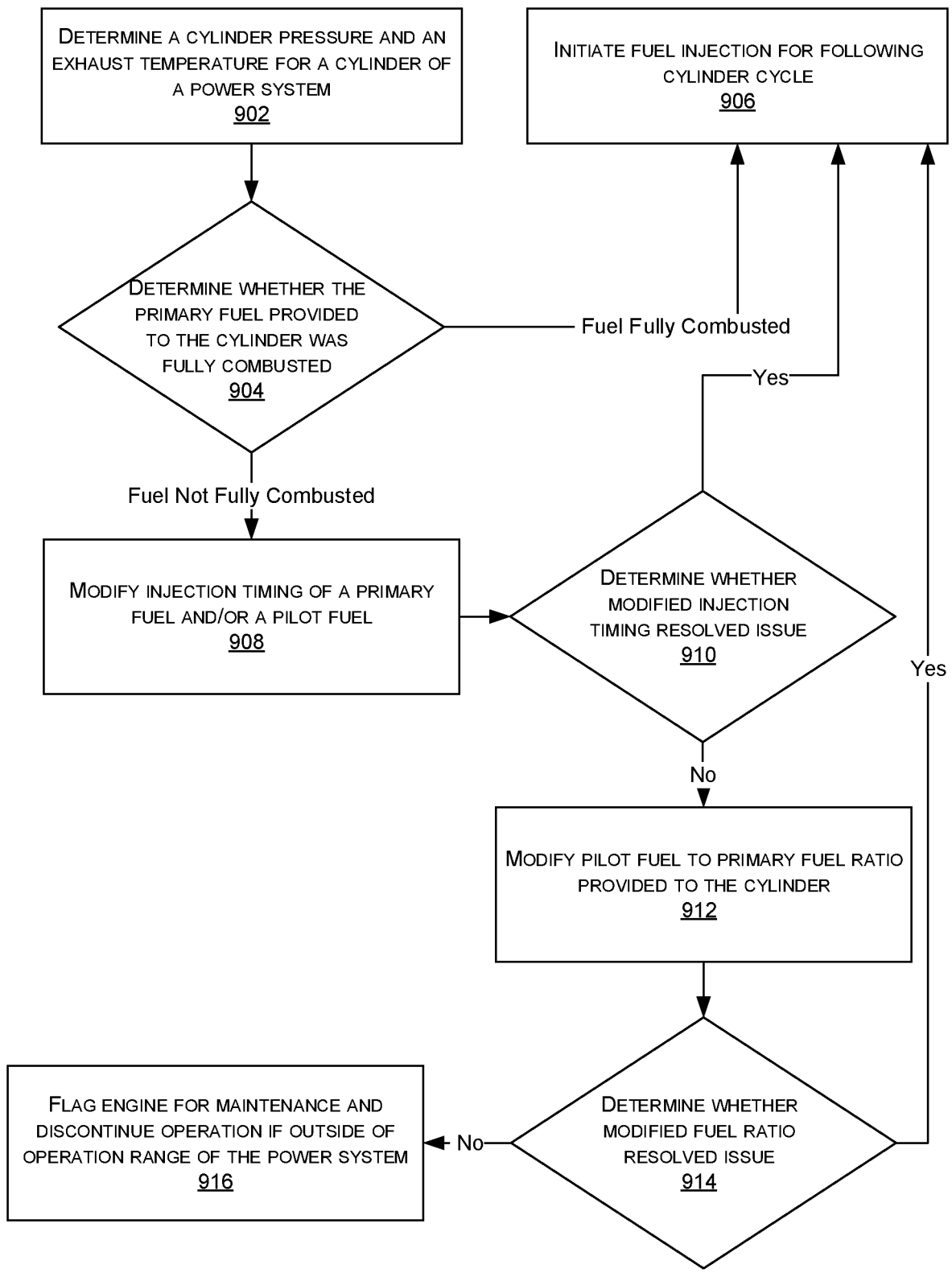
FIG. 9 is a block diagram illustrating a series of decisions for modifying injection timings and fuel ratios for a power system according to examples of the present disclosure.

FIG. 9 is a block diagram of a method 900 illustrating a series of decisions for modifying injection timings and fuel ratios for a power system. The method 900 can be executed by a processor of the controller 510 to operate various components of the control system 500 and the control system 600. Additionally, any of the methods described herein may be performed in whole, or in part, by the one or more processors associated with the controller 510 and/or other control devices associated with the power system 100.

At 902, the processor can cause a cylinder pressure sensor to determine a cylinder pressure associated with the power system 100. Additionally, the processor can cause an exhaust temperature sensor to determine an exhaust temperature for the power system 100. In particular, the cylinder pressure sensor can be configured to detect the cylinder pressure (e.g., a gauge pressure within the plurality of cylinders 104) and to transmit a first signal indicating the cylinder pressure to the controller 510. Similarly, the exhaust temperature sensor may detect the exhaust temperature of exhaust output by the plurality of cylinders 104 and transmit a second signal indicating the exhaust temperature to the controller 510. Further, the cylinder pressure sensor and/or the exhaust temperature sensor can be configured to automatically (e.g., periodically, aperiodically, based on a measurement schedule, etc.) transmit the first signal and/or the second signal. Alternatively, or in addition, the cylinder pressure sensor and/or the exhaust temperature sensor can be configured to transmit the first signal and/or the second signal in response to a measurement request transmitted by the controller 510. Accordingly, the processor of the controller 510 may utilize the first signal and the second signal to determine the cylinder pressure and the exhaust temperature.

At 904, the processor can determine whether the primary fuel provided to the cylinder was fully combusted. In particular, a memory of the controller 510 may be configured to store correlations between the cylinder pressure, the exhaust temperature, an amount of the primary fuel provided to the plurality of cylinders 104, and the variable amount of the pilot fuel provided to the plurality of cylinders 104 and consumption of the pilot fuel and the primary fuel. Incomplete combustion of the primary fuel may be indicated by the cylinder pressure sensor and/or the exhaust temperature sensor providing indications of the cylinder pressure and/or exhaust pressure that are less than an expected cylinder pressure and/or an expected exhaust temperature for the variable amount of the pilot fuel and the amount of the primary fuel provided to the power system 100. Accordingly, the processor can determine, based at least on the expected cylinder pressure and/or the expected exhaust temperature indicated by the correlations stored by the memory of the controller 510. Alternatively, or in addition, the processor can determine whether the power system 100 is operating abnormally based at least on the first signal and/or the second signal received by the controller indicate that the cylinder pressure and/or the exhaust temperature are outside of normal operating ranges for the power system 100. Similar to the correlations, the memory may be configured to store operating ranges for the expected cylinder pressure and the expected exhaust temperature that are correlated to the amount of the primary fuel provided to the plurality of cylinders 104. It should be noted that the memory of the controller 510 can be volatile (such as RAM), non-volatile (such as ROM, flash memory, etc.) or some combination of the two. The memory may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store indications of cylinder pressure, exhaust temperature, reactor temperature, power demand associated with the power system 100, and other indications generated and provided by sensors associated with the pilot fuel system and/or the processor of the controller 510.

At 906, the processor can determine that the primary fuel was fully combusted and initiate fuel injection for a subsequent cylinder cycle. In particular, the processor can determine that the engine is operating normally and initiate continued operation of the power system 100.

At 908, the processor can determine that the primary fuel was not fully combusted and modify an injection timing of the primary fuel and/or a pilot fuel. In particular, the processor can determine that the cylinder pressure and/or the exhaust temperature are outside the expected cylinder pressure and/or the expected exhaust temperature operating ranges. Additionally, the expected operating ranges (e.g., ranges for the expected cylinder pressure and/or the expected exhaust temperature at the amount of primary fuel provided) can be associated with maximum expected valve thresholds and minimum expected value thresholds. Accordingly, the processor can determine that the first signal and/or the second signal are indicative of the cylinder pressure and/or the exhaust temperature satisfying (e.g., is outside of the operating range) at least one of the maximum expected value thresholds and/or at least one of the minimum expected value thresholds. Further, the processor can modify an injection timing for the primary fuel and/or the pilot fuel based on the determination that the primary fuel was not fully combusted. For example, where the exhaust temperature indicates that the primary fuel was not fully combusted, the processor may determine that the injection of the primary fuel is to be advanced, resulting in a hotter combustion reaction that may consume additional primary fuel. Alternatively, where the exhaust temperature indicates that the combustion reaction within the plurality of cylinders 104 exceeds a maximum expected temperature threshold, the processor may determine that the injection of the primary fuel is to be retarded. Similarly, the cylinder pressure may be utilized to modify the injection timing of the primary fuel and/or the pilot fuel (e.g., higher pressure may be correlated with hotter combustion reactions and lower pressure may be correlated with incomplete combustion). Accordingly, modifying the injection timing of the primary fuel and/or the pilot fuel may be utilized to return the power system 100 to normal operation and complete combustion of the primary fuel and/or the pilot fuel.

At 910, the processor can determine whether the modified injection timing resolved the issue and/or the abnormal operation of the power system 100. In particular, the controller may receive a third signal from the cylinder pressure sensor and a fourth signal from the exhaust temperature sensor that are associated with an additional cycle of the power system 100. Additionally, the processor of the controller may determine an additional cylinder pressure and an additional exhaust temperature. Further, the processor may determine whether the additional cylinder pressure and the additional exhaust temperature satisfy the maximum expected value thresholds and/or the minimum expected value thresholds for the expected cylinder pressure and the expected exhaust temperature. It should be noted that where the modified injection timing for the pilot fuel and the primary fuel cause the additional cylinder pressure and the additional exhaust temperature to fall within the operating range for the power system 100, the processor may return to 906.

At 912, the processor can determine that the issue was not resolved and the power system 100 continues to operate abnormally. Additionally, the processor can be configured to modify the primary fuel to pilot fuel ratio that is provided to the cylinder. For example, where the processor determines that the primary fuel experienced incomplete combustion, the variable amount of the pilot fuel provided by the buffer tank pump 308 and/or the dehydration reactor 216 may be increased relative to the amount of the primary fuel. Further, the increased variable amount of the pilot fuel may result in a hotter combustion reaction that consumes additional primary fuel. Alternatively, or in addition, the amount of the primary fuel provided relative to the pilot fuel may be increased or decreased to compensate for abnormal cylinder pressure and/or abnormal exhaust temperature where permitted by the power demand associated with the power system 100. It should be noted that fluctuations in the variable amount of the pilot fuel and/or the amount of the primary fuel may be bounded by minimum amount values and maximum amount values that indicate the operating limits of the power system.

At 914, the processor can determine whether the modified fuel ratio resolved the issue. In particular, the controller may receive a fifth signal from the cylinder pressure sensor and a sixth signal from the exhaust temperature sensor that are associated with an additional cycle of the power system 100. Additionally, the processor of the controller may determine a further cylinder pressure and a further exhaust temperature. Further, the processor may determine whether the further cylinder pressure and the further exhaust temperature satisfy the maximum expected value thresholds and/or the minimum expected value thresholds for the expected cylinder pressure and the expected exhaust temperature. It should be noted that where the modified fuel ratio between the pilot fuel and the primary fuel cause the further cylinder pressure and the further exhaust temperature to fall within the operating range for the power system 100, the processor may return to 906.

At 916, the processor can determine that maintenance is to be provided for the power system 100. Additionally, the processor can determine that operation of the power system 100 is to be discontinued. In particular, the processor can determine that the abnormal operation of the power system 100 is not rectified by the modified injection timing and/or the modified fuel ratio. It should be noted that the processor may iteratively cycle between from 908 through 914 to rectify the abnormal operation of the power system 100. However, the processor may determine, based on the continued determination that the cylinder pressure and/or the exhaust temperature remaining outside of the operating ranges for the power system 100, that manual intervention is to be requested. Accordingly, the processor may generate an indication that is transmitted to an administrator, or other personnel, such that maintenance may be provided for the power system. Further, the processor may discontinue operation of the power system based at least on the cylinder pressure and the exhaust temperature exceeding safety thresholds associated with the operating ranges of the power system 100.

INDUSTRIAL APPLICABILITY

The present disclosure describes systems and methods for a single fuel tank system that stores a primary fuel that may be utilized and consumed by a power system to generate power and/or satisfy a power demand. Additionally, the primary fuel may be utilized to generate a pilot fuel that initiates ignition of the primary fuel during a combustion cycle of the power system. The example systems and methods described herein can be used with internal combustion engines, and are configured to maintain substantially continuous operation of the internal combustion-type motors while modifying injection timings, fuel ratios, and fuel production. A pilot fuel system can obtain the primary fuel from a fuel tank, determine a ratio of the primary fuel to the pilot fuel that is to be provided during operation of the power system, and provide amounts of the pilot fuel and the primary fuel that maintain operation of the power system. Additionally, the pilot fuel system can include a controller that monitors internal temperatures and pressures of the power system, the pilot fuel reactor, the fuel tank, and other support systems associated with the pilot fuel system. Fluid heaters and fluid coolers may control a fluid temperature of the primary fuel and/or the pilot fuel provided to the power system, heat exchangers and heating elements may maintain reactor temperatures within an activity range of a reactor catalyst, and a purification system may remove byproducts from the reaction(s) that generates the pilot fuel. Control schemes enable individualized modifications to the operation of individual components of the power system while the pilot fuel system may modify the ratio of the pilot fuel to the primary fuel, the flow rate of the primary fuel and the pilot fuel, and/or other process variables associated with production of the pilot fuel. Accordingly, the pilot fuel system may eliminate redundant structures that would otherwise house the pilot fuel independent of the primary fuel and improves the adaptability of the power system due to the in-line generation of the pilot fuel that is consumed during operation of the power system.

Additionally, the present disclosure describes systems and methods utilizing a liquid pilot fuel that is generated from a primary fuel to initiate combustion for a power system. In particular, the pilot fuel may be provided to the power system in a liquid phase to improve power system efficiency and operation compared to the pilot fuel in a gaseous phase. In particular, providing the primary fuel in the liquid phase enables the power system 100 to operate under cold start conditions and utilize a range of injection timings that ensure efficient operation and power generation. More specifically, introducing the primary fuel in the liquid phase provides improved combustion efficiency (e.g., extraction of mechanical energy from the primary fuel versus loss of thermal energy from converting chemical energy to mechanical energy) and better control over operations of the power system 100 than systems utilizing the pilot fuel in the gaseous phase. Additionally, utilization of the pilot fuel in the liquid phase enables a wider range of compression ratios. It should be noted that the compression ratio is a ratio of the length of a cylinder while the piston within the cylinder is fully extended to the length of the cylinder while the piston is fully retracted (e.g., a ratio of a bottom dead center (BDC) volume and a top dead center (TDC) volume). Further, the pilot fuel being provided in the liquid phase enables higher compression ratios than providing the pilot fuel in the gaseous phase. Accordingly, the higher compression ratios, the cold start capability, and improved combustion efficiency is associated with more efficient operation of the power system 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system, comprising:
a fuel tank configured to store a primary fuel;
a fluid pump fluidly connected to the fuel tank and configured to obtain the primary fuel from the fuel tank and provide the primary fuel via a reactor feed line and a primary fuel line fluidly connected to the fluid pump;
a dehydration reactor configured to receive the primary fuel, via the reactor feed line, and convert a portion of the primary fuel to a pilot fuel and a byproduct; and
a power system configured to initiate a combustion reaction with the pilot fuel, wherein the combustion reaction consumes the primary fuel, the power system comprising:
a cylinder configured to receive the pilot fuel, via a pilot fuel line, and the primary fuel, via a primary fuel line,
a pilot fuel injector configured to receive the pilot fuel from the dehydration reactor, and to provide the pilot fuel to the cylinder, in a liquid phase, at a first time at which the combustion reaction is initiated within the cylinder, and
a primary fuel injector configured to receive the primary fuel from the primary fuel line, and to provide the primary fuel to the cylinder at a second time during the combustion reaction and after the first time.

2. The system of claim 1, the system further comprising a heat exchanger fluidly connected to the fluid pump via the reactor feed line, wherein the heat exchanger is configured to increase a temperature of the primary fuel received from the fluid pump from a first temperature to an input temperature of the dehydration reactor that is greater than the first temperature.

3. The system of claim 2, wherein the heat exchanger defines a first fluid path and a second fluid path separate from the first fluid path, wherein the first fluid path is configured to transfer thermal energy from fluid passing through the second fluid path to the primary fuel passing through the first fluid path,
the first fluid path being fluidly connected to the reactor feed line and the dehydration reactor, and
the second fluid path being fluidly connected to at least one of a reactor output line or an exhaust line.

4. The system of claim 1, the system further comprising a purification system, the purification system being configured to:
receive the pilot fuel and the byproduct from the dehydration reactor,
separate a first portion of the byproduct from the pilot fuel, and
provide the pilot fuel, together with a second portion of the byproduct, to the pilot fuel injector.

5. The system of claim 1, wherein the dehydration reactor is configured to pass the primary fuel received via the reactor feed line through a catalyst such that a first portion of the primary fuel is converted into the pilot fuel and a second portion of the primary fuel is output by the dehydration reactor in solution with the pilot fuel.

6. The system of claim 1, further comprising a liquefaction system that is configured to receive the pilot fuel from the dehydration reactor in a gaseous phase and output the pilot fuel to the pilot fuel injector in the liquid phase.

7. The system of claim 1, wherein:
the primary fuel pump is configured to provide the primary fuel to the power system via the primary fuel line; and
a reactor feed pump is configured to provide the primary fuel to the dehydration reactor via the reactor feed line.

8. The system of claim 1, the system further comprising a temperature regulation system that is configured to receive the primary fuel, and modify a temperature of the primary fuel from a first temperature associated with the fuel tank to an input temperature of the power system different from the first temperature.

9. A method, comprising:
directing a first amount of a primary fuel from a fuel tank to a cylinder of a power system, via a primary fuel line;
determining, based on the first amount, a second amount of a pilot fuel required to initiate combustion of the primary fuel and to enable combustion of the first amount of the primary fuel within the cylinder, wherein the pilot fuel is provided as a subcooled liquid;
directing, via a reactor feed line, a third amount of the primary fuel from the fuel tank to a dehydration reactor, the dehydration reactor converting the third amount of the primary fuel to the second amount of the pilot fuel; and
directing the second amount of the pilot fuel from the dehydration reactor to the cylinder of the power system, via a pilot fuel line, such that
the second amount of the pilot fuel is compressed within the cylinder and initiates a combustion reaction within the cylinder; and
the combustion reaction initiated by the second amount of the pilot fuel within the cylinder consumes the first amount of the primary fuel to drive substantially cyclical operation of the power system.

10. The method of claim 9, wherein:
the first amount of the primary fuel is determined to include the third amount of the primary fuel utilized to generate the second amount of the pilot fuel; and
directing the third amount of the primary fuel to the dehydration reactor further comprises splitting the first amount of the primary fuel to obtain the third amount of the primary fuel.

11. The method of claim 9, wherein directing the second amount of the pilot fuel and the first amount of the primary fuel to the cylinder further comprises:
directing the first amount of the primary fuel and the second amount of the primary fuel to a fuel mixer, the fuel mixer configured to combine the first amount and the second amount and output a mixed fuel; and
causing a fuel injector to provide the mixed fuel into the cylinder of the power system.

12. The method of claim 9, wherein directing the second amount of the pilot fuel and the first amount of the primary fuel to the cylinder further comprises:
directing the first amount of the primary fuel to a primary fuel injector configured to provide the first amount of the primary fuel into the cylinder of the power system; and
directing the second amount of the pilot fuel to a pilot fuel injector configured to provide the second amount of the pilot fuel into the cylinder of the power system.

13. The method of claim 9, wherein the dehydration reactor is configured to pass the third amount of the primary fuel through a catalyst structure at a flow rate, wherein the catalyst structure enables conversion of the third amount of the primary fuel into the second amount of the pilot fuel.

14. A system, comprising:
one or more processors; and a memory storing instructions that are executable by the one or more processors to perform operations comprising:

receive a first signal from a pressure sensor associated with a cylinder of a power system, the first signal indicating a first pressure within the cylinder;

receive a second signal from a temperature sensor associated with the cylinder, the second signal indicating a first exhaust temperature associated with the cylinder;

determine whether the first cylinder pressure satisfies a pressure threshold associated with combustion of primary fuel within the cylinder;

determine whether the first exhaust temperature satisfies a temperature threshold associated with combustion of the primary fuel within the cylinder;

determine, based on at least one of the first cylinder pressure satisfying the pressure threshold or the first exhaust temperature satisfying the temperature threshold, an injection timing configured to provide a pilot fuel, via a pilot fuel line, to the power system at a first time to initiate combustion of the primary fuel injected at a second time;

determine a ratio between the pilot fuel and the primary fuel, wherein an amount of the primary fuel is provided, via a primary fuel line, to a dehydration reactor to generate the primary fuel based on the ratio; and cause, based on the injection timing and the ratio,
the pilot fuel to be provided from the dehydration reactor to the cylinder, and
the primary fuel to be provided from a fuel tank to the cylinder.

15. The system of claim 14, further comprising:

receive a third signal, from the pressure sensor, associated with the cylinder, the third signal indicating a second pressure within the cylinder;

receive a fourth signal, from the temperature sensor, associated with the cylinder, the fourth signal indicating a second exhaust temperature associated with the cylinder; and determine, based on the second pressure and the second exhaust temperature, whether the power system satisfies a second temperature threshold a second pressure threshold; and determine, based at least on the second temperature threshold or the second pressure threshold being satisfied, that the power system is to maintain operation via the injection timing and the ratio.

16. The system of claim 14, wherein the injection timing is a pilot fuel injection timing and the operations further comprise:

determine, based on at least one of the first pressure and the first exhaust temperature, that primary fuel injection timing that defines a delay between the first time and the second time that modifies an ignition phase of the primary fuel.

17. The system of claim 16, further comprising:

cause, based at least on the pilot fuel injection timing, the pilot fuel to be obtained from the dehydration reactor and provided to cylinder during a compression stroke of the cylinder, wherein the compression stroke compresses the pilot fuel to initiate combustion; and cause, based at least on the primary fuel injection timing, the primary fuel to be obtained from at least the fuel tank and provided to the cylinder after ignition of the pilot fuel.

18. The system of claim 14, wherein:

the injection timing comprises one or more controls for causing the pilot fuel and the primary fuel to be provided to the cylinder for combustion via a pilot fuel injector; and causing the pilot fuel to be provided from the dehydration reactor to the cylinder and the primary fuel to be provided from the fuel tank to the cylinder further comprises causing the pilot fuel to be combined with the primary fuel and provided to the cylinder via the pilot fuel injector.

19. The system of claim 14, wherein:

the ratio is generated based at least on a flow rate of the primary fuel through the dehydration reactor;

the flow rate of the primary fuel through the dehydration reactor is caused via activation of a reactor feed pump; and the ratio is achieved based at least on the pilot fuel generated from the primary fuel at the flow rate through the dehydration reactor and activation of a primary fuel pump that provides the primary fuel via a primary fuel line.

20. The system of claim 14, the operations further comprising:

determining, based at least on a pollutant sensor, a pollutant output associated with operation of the cylinder at the ratio and the injection timing, wherein the pollutant output exceeding a pollutant threshold causes a retarded injection timing to be utilized in place of the injection timing.

* * * * *